(12) United States Patent
Kuno

(10) Patent No.: US 9,071,786 B2
(45) Date of Patent: Jun. 30, 2015

(54) PRINTING AND PRINT DATA GENERATING DEVICES, COMPUTER-READABLE MEDIA FOR STORING GENERATING INSTRUCTIONS, AND METHODS OF GENERATING PRINT DATA

(75) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 57 days.

(21) Appl. No.: 13/411,076

(22) Filed: Mar. 2, 2012

(65) Prior Publication Data
US 2012/0236330 A1      Sep. 20, 2012

(30) Foreign Application Priority Data

Mar. 16, 2011   (JP) .................................. 2011-058553

(51) Int. Cl.
G06K 15/10        (2006.01)
H04N 1/387        (2006.01)

(52) U.S. Cl.
CPC ........... *H04N 1/3876* (2013.01); *H04N 1/3877* (2013.01)

(58) Field of Classification Search
None
See application file for complete search history.

(56) References Cited

U.S. PATENT DOCUMENTS

| | | | | |
|---|---|---|---|---|
| 2008/0240749 A1 * | 10/2008 | Horade | ........................... | 399/43 |
| 2009/0060344 A1 * | 3/2009 | Yamazaki et al. | ............ | 382/195 |
| 2009/0201523 A1 | 8/2009 | Saito | | |
| 2009/0244159 A1 | 10/2009 | Kusunoki | | |
| 2010/0309238 A1 | 12/2010 | Taniguchi | | |
| 2010/0315451 A1 | 12/2010 | Bansyo et al. | | |
| 2011/0043873 A1 * | 2/2011 | Maruo | ........................... | 358/475 |

FOREIGN PATENT DOCUMENTS

| | | | |
|---|---|---|---|
| JP | 2001-270088 | A | 10/2001 |
| JP | 2004-262171 | A | 9/2004 |
| JP | 2005-280213 | A | 10/2005 |
| JP | 2006-159702 | A | 6/2006 |
| JP | 2007-030201 | A | 2/2007 |

(Continued)

OTHER PUBLICATIONS

Japan Patent Office, Notice of Reasons for Rejection for Japanese Patent Application No. 2011-058553 (counterpart to above-captioned patent application), mailed Apr. 9, 2013.

*Primary Examiner* — Vincent Rudolph
*Assistant Examiner* — Richa Mishra
(74) *Attorney, Agent, or Firm* — Baker Botts L.L.P.

(57) ABSTRACT

A print data generating device includes an image orientation selecting portion and a print data generating portion. The image orientation selecting portion may select one image orientation of an image to be printed from several image orientations by using partial image data. The print data generating portion may generate print data for printing the image according to the one image orientation. Each image orientation may be with respect to a conveying direction. Each partial image data may correspond to a respective image orientation, a respective partial image, and a respective portion of the image to be printed. Each partial image may be printed in an area defined by a particular distance determined from a corresponding edge of the printing medium. The particular distance may be based on a distance between a location of a downstream roller and a location of a most-upstream nozzle for a printer in the conveying direction.

24 Claims, 15 Drawing Sheets

(56) References Cited

FOREIGN PATENT DOCUMENTS

| JP | 2009-214534 A | 9/2009 |
| JP | 2009-233891 A | 10/2009 |
| JP | 2009-262346 A | 11/2009 |
| JP | 2010-100017 A | 5/2010 |
| JP | 2010179463 A * | 8/2010 |
| JP | 2010-284833 A | 12/2010 |
| JP | 2011-011544 A | 1/2011 |

* cited by examiner

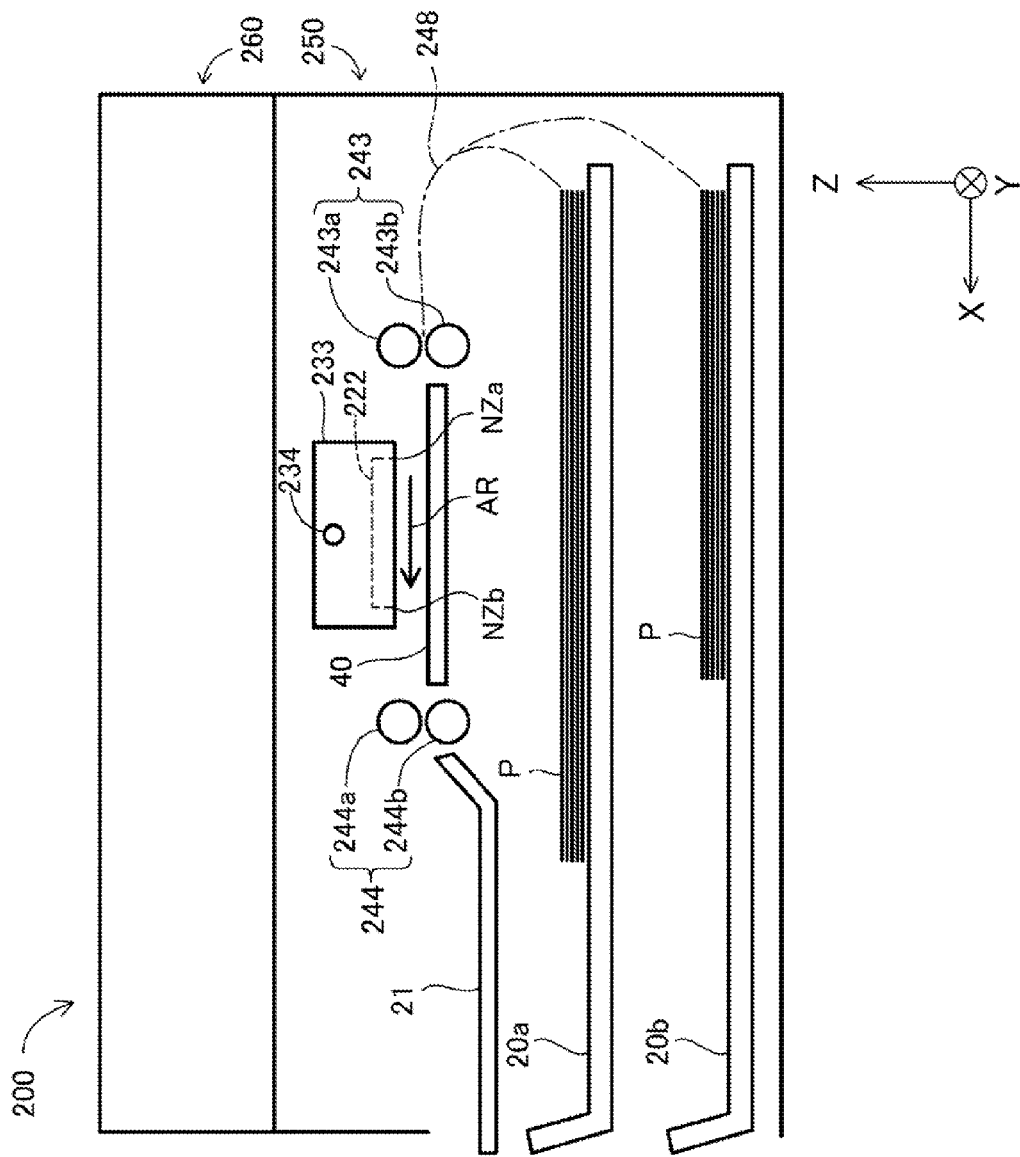

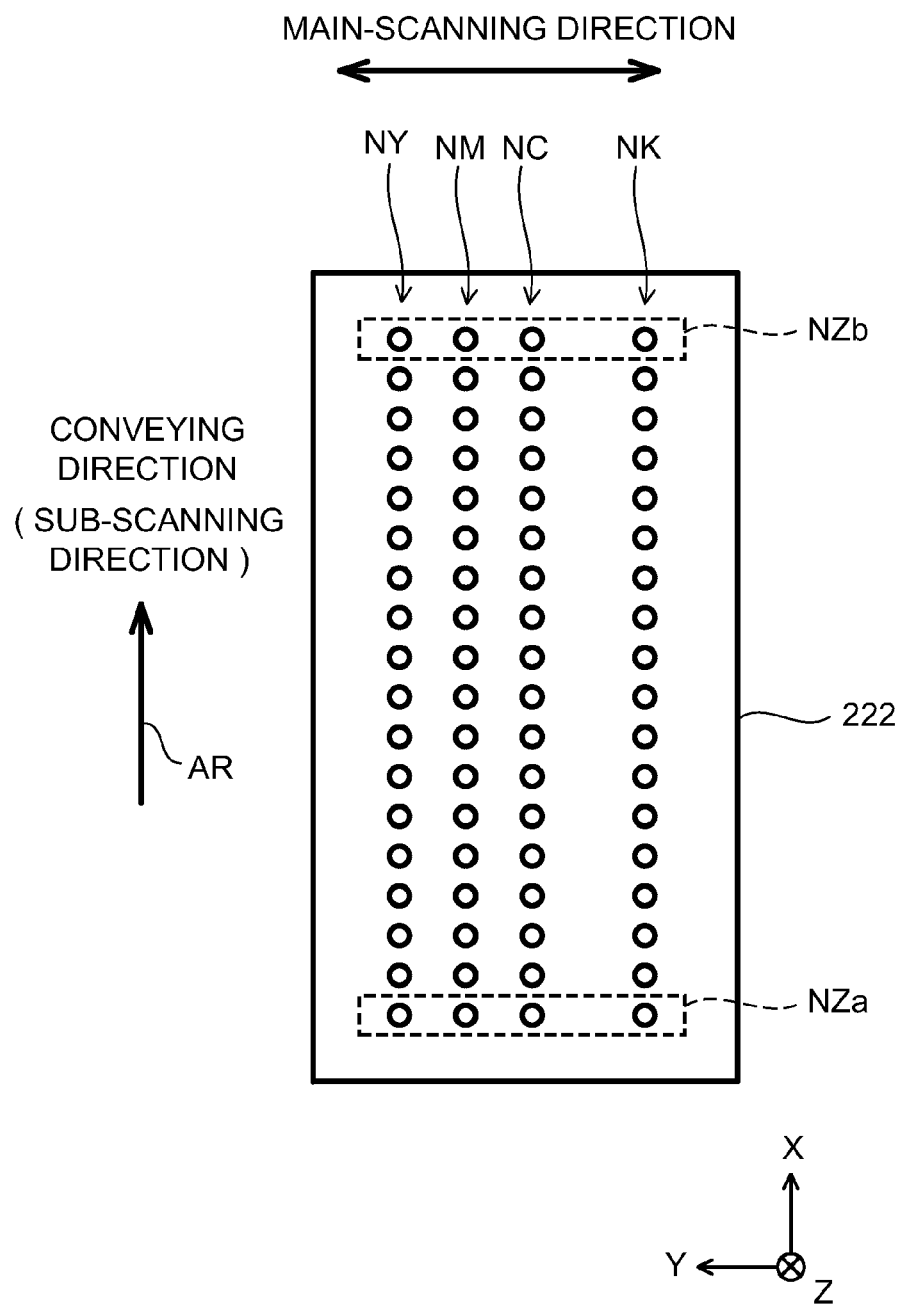

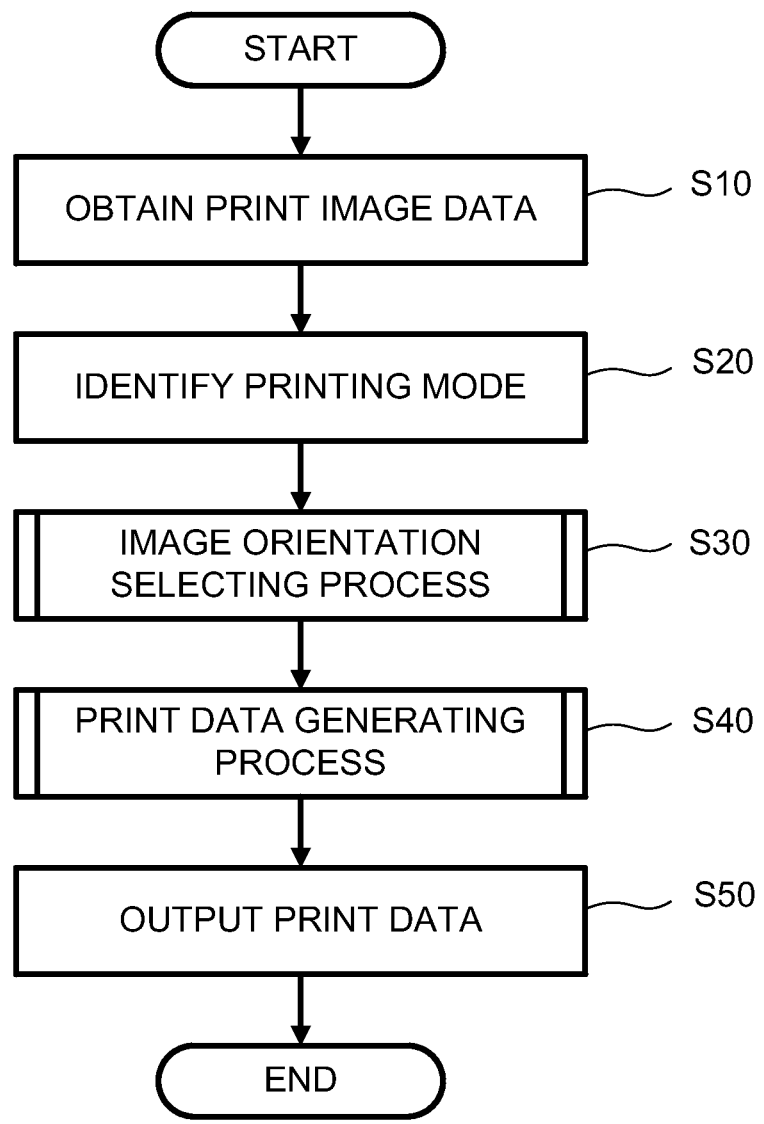

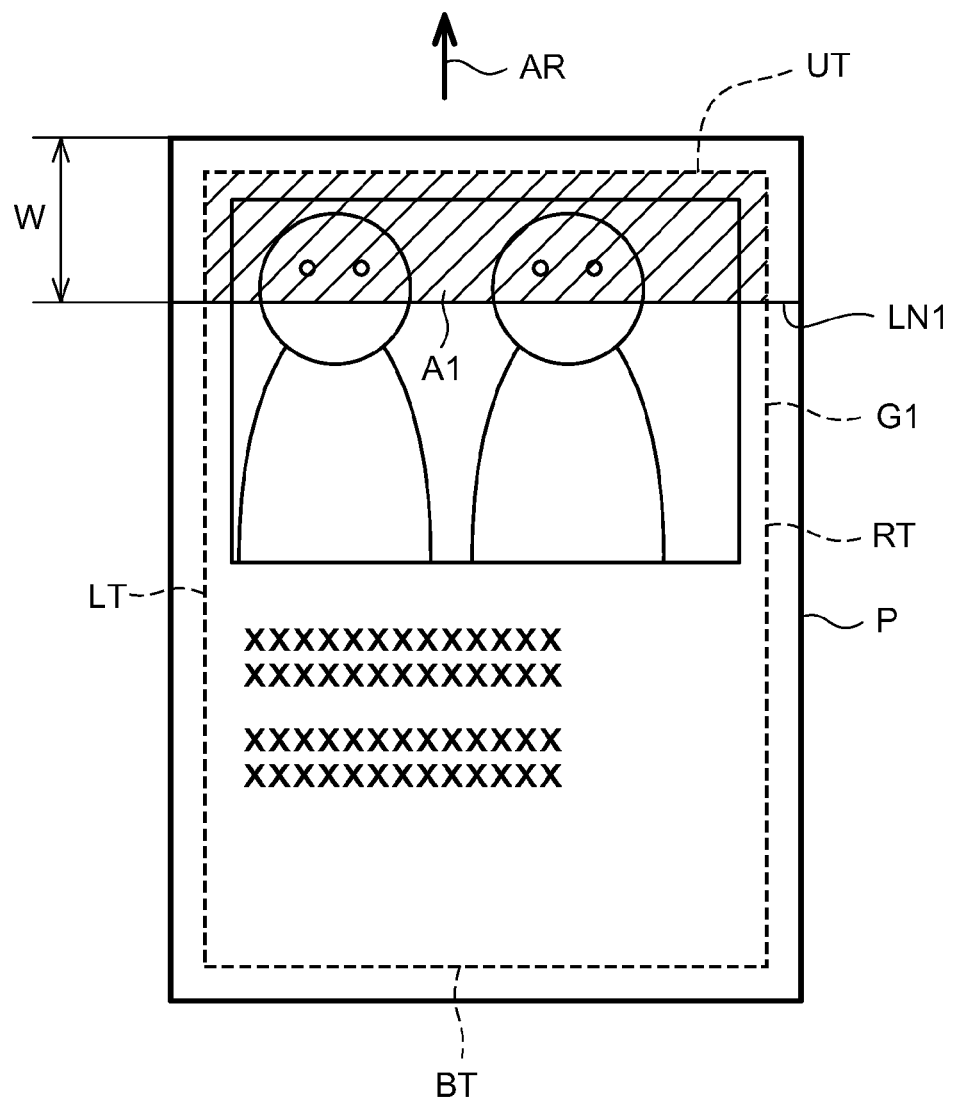

SECOND IMAGE ORIENTATION

THIRD IMAGE ORIENTATION

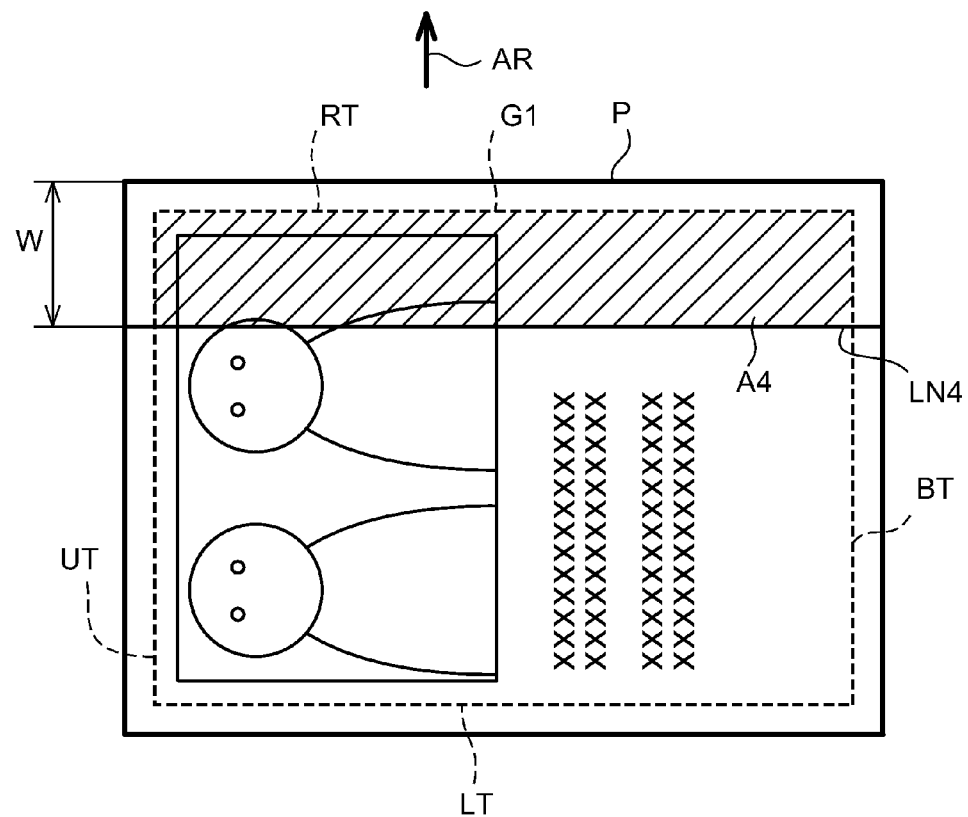

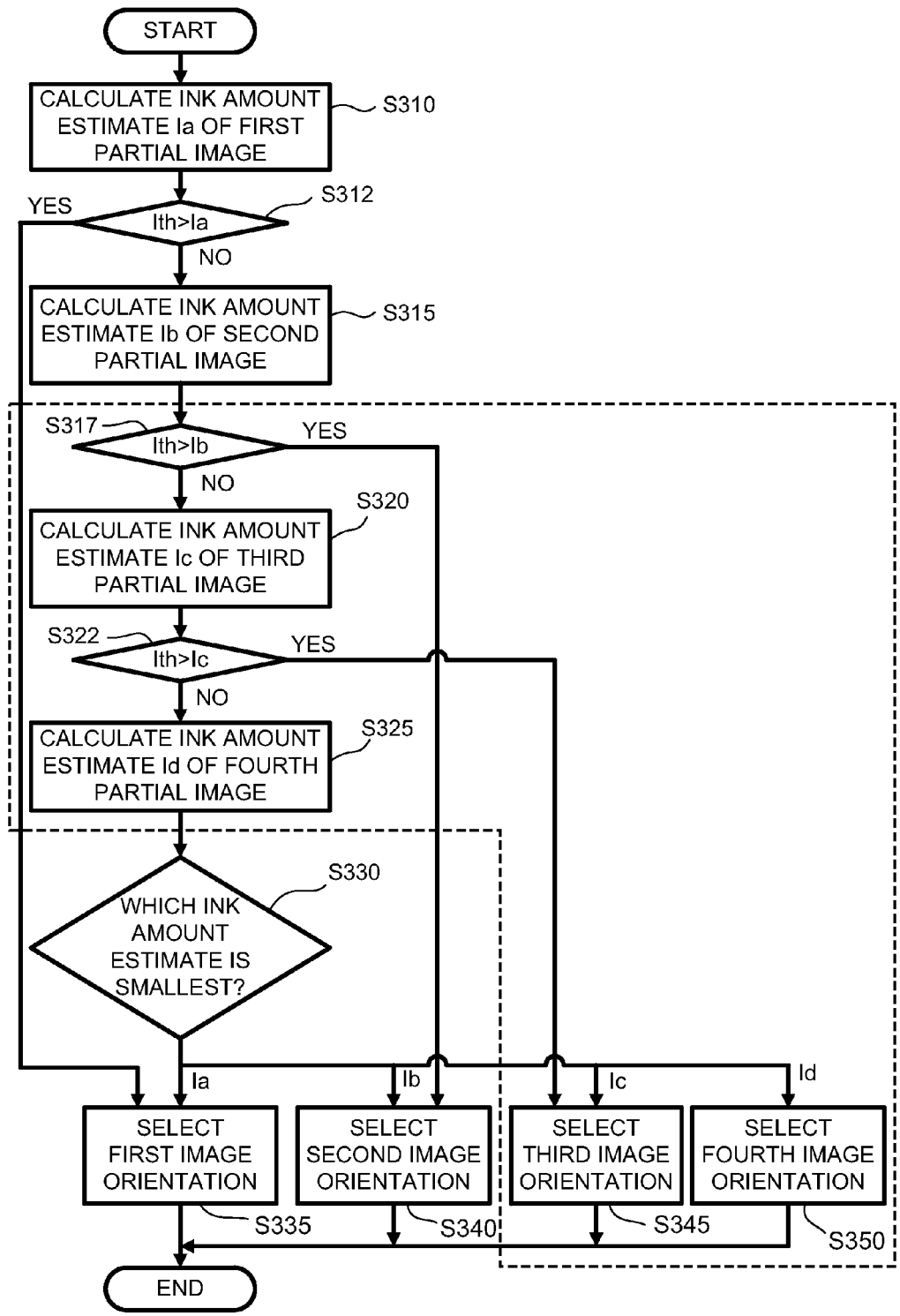

PRINTING AND PRINT DATA GENERATING DEVICES, COMPUTER-READABLE MEDIA FOR STORING GENERATING INSTRUCTIONS, AND METHODS OF GENERATING PRINT DATA

CROSS-REFERENCE TO RELATED APPLICATION

The present application claims priority from Japanese Patent Application No. 2011-058553, filed on Mar. 16, 2011, which is incorporated herein by reference.

BACKGROUND OF THE INVENTION

1. Field of the Invention

The invention relates to techniques for generating print data to be used in printing performed while a sheet is being conveyed.

2. Description of Related Art

A known printing apparatus prints an image by ejecting ink onto a sheet to form dots thereon; however, the sheet may deform due to the printing.

A known a technique for changing an orientation of an image to be printed onto a sheet reduces the instances of sheet conveyance failures due to sheet deformation. In the known technique, a comparison is made between a print duty of an image to be printed onto a leading half of a sheet (i.e., a first half image) and a print duty of an image to be printed onto a trailing half of the sheet (i.e., a second half image). When the print duty of the first half image is greater than the print duty of the second half image, the orientation of the image to be printed changes by 180 degrees and the printing apparatus prints the image onto the sheet with the first half image and the second half image in switched positions.

SUMMARY OF THE INVENTION

The known technique may not reduce effectively the instances of sheet conveyance failures in the printing apparatus caused by sheet deformation. For example, the sheet may deform convexly due to moisture when a portion of a printed surface of the sheet absorbs liquid ink. Such deformation may cause a sheet conveyance failure in the printing apparatus.

Therefore, a need has arisen for a print data generating device and computer program that may overcome these and other shortcomings of the related art. A technical advantage of the present invention is that instances of sheet conveyance failure in a printing apparatus configured to perform printing by ejecting ink onto a sheet may be efficiently reduced.

A printing device disclosed herein may comprise a print executing portion, an image orientation selecting portion, and a print data generating portion. The print executing portion may comprise a conveying mechanism and a print head. The conveying mechanism may be configured to convey a printing medium in a conveying direction. The conveying mechanism may comprise a downstream roller configured to pinch and convey the printing medium at a position downstream from the print head. The print head may comprise a plurality of nozzles and may be configured to eject ink from the plurality of nozzles onto the printing medium. The image orientation selecting portion may be configured to select one image orientation of an image to be printed from a plurality of image orientations by using a plurality of partial image data. The print data generating portion may be configured to generate print data for printing the image according to the one selected image orientation. Each image orientation of the plurality of image orientations may be with respect to the conveying direction. Each partial image data of the plurality of partial image data may correspond to a respective image orientation of the plurality of image orientations, a respective partial image of a plurality of partial images, and a respective portion of the image to be printed. Each partial image of the plurality of partial images may be configured to be printed in an area defined by a particular distance determined from a corresponding edge of the printing medium. The particular distance may be based on a distance between the downstream roller and a most-upstream nozzle of the plurality of nozzles in the print head.

A non-transitory, computer-readable storage medium disclosed herein may comprise computer-readable instructions for a processor of a print data generating device to perform several steps. The computer-readable instructions may instruct the processor to perform the step of selecting one image orientation of an image to be printed from a plurality of image orientations by using a plurality of partial image data. The computer-readable instructions may instruct the processor to perform the step of generating print data for printing the image according to the one selected image orientation. Each image orientation of the plurality of image orientations may be with respect to a printing-medium conveying direction. Each partial image data of the plurality of partial image data may correspond to a respective image orientation of the plurality of image orientations, a respective partial image of a plurality of partial images, and a respective portion of the image to be printed. Each partial image of the plurality of partial images may be configured to be printed in an area defined by a particular distance determined from a corresponding edge of a printing medium. The particular distance may be based on a distance between a location of a most-upstream nozzle and a location of a downstream roller for a printer in the printing-medium conveying direction.

A print data generating device disclosed herein may comprise a processor and a memory. The memory may be configured to store computer-readable instructions therein. The computer-readable instructions may instruct the processor to function as an image orientation selecting portion configured to select one image orientation of an image to be printed from a plurality of image orientations by using a plurality of partial image data. The computer-readable instructions may instruct the processor to function as a print data generating portion configured to generate print data for printing the image according to the selected one image orientation. Each image orientation of the plurality of image orientations may be with respect to a printing-medium conveying direction. Each partial image data of the plurality of partial image data may correspond to a respective image orientation of the plurality of image orientations, a respective partial image of a plurality of partial images, and a respective portion of the image to be printed. Each partial image of the plurality of partial images may be configured to be printed in an area defined by a particular distance determined from a corresponding edge of a printing medium. The particular distance may be based on a distance between a location of a most-upstream nozzle and a location of a downstream roller for a printer in the printing-medium conveying direction.

A method executed in a print data generating device disclosed herein may comprise steps for generating print data. The method may comprise a step of selecting one image orientation of an image to be printed from a plurality of image orientations by using a plurality of partial image data. The method may comprise a step of generating print data on a processor for printing the image according to the one selected image orientation. Each image orientation of the plurality of image orientations may be with respect to a printing-medium conveying direction. Each partial image data of the plurality of partial image data may correspond to a respective image orientation of the plurality of image orientations, a respective partial image of a plurality of partial images, and a respective portion of the image to be printed. Each partial image of the plurality of partial images may be configured to be printed in an area defined by a particular distance determined from a corresponding edge of a printing medium. The particular distance may be based on a distance between a location of a most-upstream nozzle and a location of a downstream roller for a printer in the printing-medium conveying direction.

According to the configurations described above, the distance may be determined according to the distance between the most-upstream nozzle and the downstream roller. Therefore, the partial image data suitable for determining the possibility of a conveyance failure in the downstream roller may be used. Because the one of the plurality of image orientations may be selected by using the partial image data, an image orientation that may prevent or reduce conveyance failure may be efficiently selected and conveyance failures may be efficiently restricted.

The invention may be realized in various configurations comprising, for example, a printing device comprising the print data generating device, a method for generating print data, and a storage medium storing computer-readable instructions for implementing functions of the print data generating device.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following descriptions taken in connection with the accompanying drawings.

FIG. 2A is a schematic view of a configuration of a printing portion of a multifunction peripheral according to one or more embodiments of the invention; and FIG. 2B is a bottom view of a print head of the printing portion of FIG. 2A according to one or more embodiments of the invention.

FIG. 3 is a flowchart of an image processing process according to one or more embodiments of the invention.

FIG. 4A depicts a sheet including an image in a first image orientation according to one or more embodiments of the invention; FIG. 4D depicts a sheet including an image in a fourth image orientation according to one or more embodiments of the invention.

FIG. 9 is a flowchart of an image orientation selecting process in the image processing process of FIG. 3 according to one or more embodiments of the invention.

DETAILED DESCRIPTION OF EMBODIMENTS OF THE INVENTION

Figure 1:
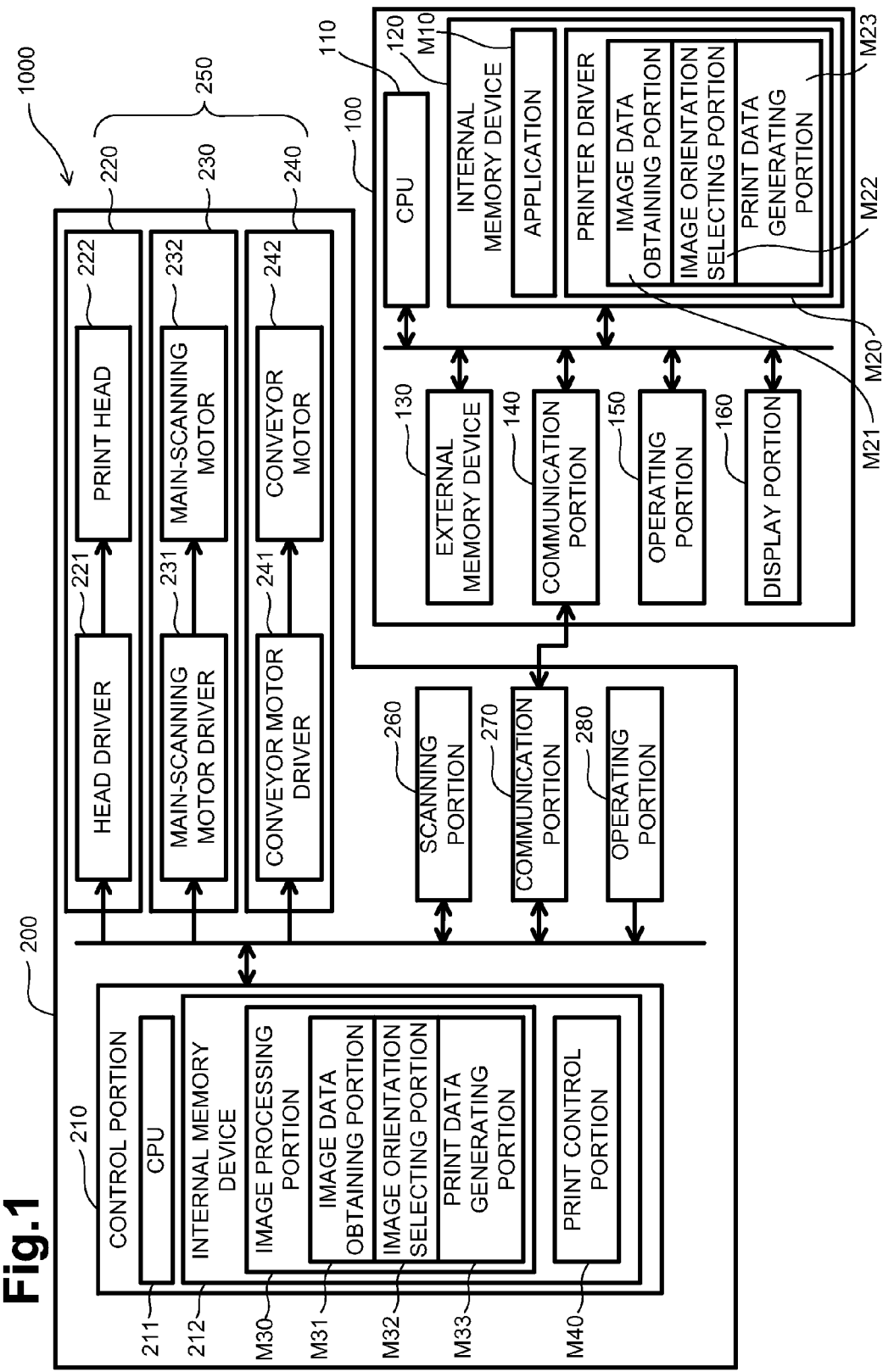
FIG. 1 is a block diagram depicting a configuration of a printing system according to one or more embodiments of the invention.

Embodiments of the invention now are described in detail with reference to the accompanying drawings. As depicted in FIG. 1, a printing system 1000 may comprise a personal computer 100 and a multifunction peripheral 200.

The personal computer 100 may comprise a central processing unit ("CPU") 110; an internal memory device 120, e.g., a read-only memory ("ROM") or a random-access memory ("RAM"); an external memory device 130, e.g., a hard disk; a communication portion 140 comprising an interface for establishing a connection with external equipment; an operating portion 150, e.g., a mouse and a keyboard; and a display portion 160, e.g., a display. The communication portion 140 may communicate data with the external equipment. For example, the communication portion 140 may receive image data from a digital camera (not depicted) or may provide print data to the multifunction peripheral 200.

Referring to FIG. 1, the internal memory device 120 may store a computer program (i.e., an application program) that may function as an application M10 for document preparation or image generation and a computer program that may function as a printer driver M20. The CPU 110 may implement the functions of the application M10 and of the printer driver M20, by executing each of the respective computer programs. A computer-readable recording medium, e.g., a CD-ROM, may provide each computer program to the personal computer 100.

Referring to FIG. 1, the printer driver M20 may obtain image data representing an image to be printed from the application M10, generate print data based on the image data, and provide the generated print data to the multifunction peripheral 200. The printer driver M20 may comprise an image data obtaining portion M21, an image orientation selecting portion M22, and a print data generating portion M23. Processing performed by the functional portions M21, M22, and M23 is described below.

The multifunction peripheral 200 may comprise a control portion 210 for controlling entire operations of the multifunction peripheral 200, an inkjet-type printing portion 250, a flatbed-type scanning portion 260, a communication portion 270, and an operating portion 280 which may comprise an operating panel and various buttons. The communication portion 270 may comprise an interface for establishing connection with a calculator, e.g., the personal computer 100, or a storage device, e.g., a USB memory. The communication portion 270 may communicate data with the calculator or with the storage device. For example, the communication portion 270 may receive print data from the personal computer 100 or receive image data representing an image from the USB memory.

The control portion 210 may be a known computer comprising a CPU 211 and an internal memory device 212, e.g., a RAM and a ROM. The internal memory device 212 may store various programs for implementing functional portions configured to control the multifunction peripheral 200. FIG. 1 depicts functional portions required to explain the embodiments of the invention. The internal memory device 212 may store a computer program, which may instruct a portion of multifunction peripheral 200 to function as an image processing portion M30, and a computer program, which may instruct a portion of multifunction peripheral 200 to function as a print control portion M40 for controlling the printing portion 250.

The image processing portion M30 may generate print data from image data to be printed, which may be obtained from the calculator or the storage device connected with the interface of the communication portion 270, and may provide the generated print data to the print control portion M40. As depicted in FIG. 1, the image processing portion M30 may comprise an image data obtaining portion M31, an image orientation selecting portion M32, and a print data generating portion M33. The functional portions M31, M32, and M33 of the multifunction peripheral 200 may perform the same or similar functions as the functional portions M21, M22, and M23 of the printer driver M20 of the personal computer 100. Therefore, a detailed description for the functional portions M31, M32, and M33 is omitted herein. When the printer driver M20 of the personal computer 100 provides print data to the multifunction peripheral 200, the printer driver M20 may provide directly the print data to the print control portion M40 by bypassing the image processing portion M30.

The print control portion M40 may control the printing portion 250 to print based on the print data provided from the image processing portion M30 or based on the print data provided from the printer driver M20 of the personal computer 100.

The printing portion 250 may print by ejecting ink in the colors of cyan ("C"), magenta ("M"), yellow ("Y"), and black ("K"). The printing portion 250 may comprise an ink ejecting mechanism 220, a main-scanning mechanism 230, and a conveying mechanism 240. The conveying mechanism 240 may comprise a conveyor motor 242 and a conveyor motor driver 241 that may drive the conveyor motor 242. The conveying mechanism 240 may convey a sheet using the conveyor motor 242. The ink ejecting mechanism 220 may comprise a print head 222 and a head driver 221, which may drive the print head 222. The ink ejecting mechanism 220 may form an image by ejecting ink from the print head 222 onto a sheet, which the conveying mechanism 240 conveys. The main-scanning mechanism 230 may comprise a main-scanning motor 232 and a main-scanning motor driver 231, which may drive the main-scanning motor 232. The main-scanning mechanism 230 may reciprocate the print head 222 in a main-scanning direction using the main-scanning motor 232.

As depicted in FIG. 2A, the printing portion 250 may comprise first and second sheet trays 20a and 20b, a sheet discharge tray 21, and a platen 40. The first and second sheet trays 20a and 20b may accommodate a rectangular sheet P, e.g., an A4-sized sheet, therein. The sheet discharge tray 21 may hold a sheet P discharged after printing. The platen 40 may be disposed opposite to an ink ejecting surface of the print head 222. The first sheet tray 20a may accommodate the sheet P, such that a longer side of the sheet P may extend in a direction parallel to a sheet conveying direction, and the second sheet tray 20b may accommodate the sheet P, such that a shorter side of the sheet P may extend in the direction parallel to the sheet conveying direction.

The conveying mechanism 240 may convey the sheet P along a conveying path that may extend from the first sheet tray 20a or the second sheet tray 20b to the sheet discharge tray 21 by passing over the platen 40. In FIG. 2A, an arrow AR may indicate a conveying direction of the sheet P over the platen 40 (i.e., a positive X-direction, as depicted in FIG. 2A). Hereinafter, the conveying direction of the sheet P over the platen 40 may be referred to as a conveying direction AR. Upstream and downstream dispositions along the conveying path may be defined according to the conveying direction AR.

The conveying mechanism 240 may comprise an upstream pinching portion 243, a downstream pinching portion 244, and an upstream conveyor portion (not depicted). The upstream pinching portion 243 and the downstream pinching portion 244 may be disposed on an upstream side and downstream side of the platen 40 along the conveying direction AR, respectively. The upstream conveyor portion (not depicted) may be configured to convey the sheet P and may be disposed in an upstream conveying path 248 (depicted by a dashed line in FIG. 2A) that may extend from the first sheet tray 20a or the second sheet tray 20b to the upstream pinching portion 243. The upstream pinching portion 243 may comprise an upstream conveyor roller 243a and an upstream following roller 243b. The conveyor motor 242 may rotatably drive the upstream conveyor roller 243a. The rollers 243a and 243b may convey the sheet P in the conveying direction AR by sandwiching the sheet P therebetween. The downstream pinching portion 244 may comprise a downstream conveyor roller 244a and a downstream following roller 244b. The conveyor motor 242 may rotatably drive the downstream conveyor roller 244a. The rollers 244a and 244b may convey the sheet P in the conveying direction AR by sandwiching the sheet P therebetween. Alternatively, plate members may be used in place of the upstream and downstream following rollers 243b, 244b.

The main-scanning mechanism 230 may further comprise a carriage 233 equipped with the print head 222 and a slidable shaft 234. The slidable shaft 234 may hold the carriage 233 that reciprocates along a main-scanning direction (i.e., a Y-direction, as depicted in FIG. 2A). The main-scanning mechanism 230 may reciprocate the carriage 233 along the slidable shaft 234 using the main-scanning motor 232.

As depicted in FIG. 2B, the print head 222 may have a plurality of nozzle rows, each of which may comprise a plurality of nozzles, formed in its surface facing the platen 40. The plurality of nozzle rows may comprise nozzle rows NC, NM, NY, and NK, which may eject ink in the colors of cyan, magenta, yellow, and black, respectively. Nozzles, which may be disposed in a most-upstream position (i.e., farthest upstream along the negative X-direction, as depicted in FIGS. 2A and 2B), relative to other nozzles of the plurality of nozzles constituting the nozzles rows NC, NM, NY, and NK, may be referred to as most-upstream nozzles NZa. Nozzles which may be disposed in a most-downstream position (i.e., farthest downstream along the positive X-direction, as depicted in FIGS. 2A and 2B), relative to other nozzles of the plurality of nozzles constituting the nozzles rows NC, NM, NY, and NK, may be referred to as most-downstream nozzles NZb.

As depicted in FIG. 1, the print control portion M40 may control the ink ejecting mechanism 220, the main-scanning mechanism 230, and the conveying mechanism 240 to repeatedly perform unit printing and unit conveyance in an alternating manner in order to accomplish printing. In each unit printing, the print head 222 may eject ink from the nozzles onto a sheet P while the print head 222 scans in the main-scanning direction and the conveying mechanism 240 holds sheet P at a standstill on the platen 40. In each unit conveyance, the conveying mechanism 240 may move the sheet P in the conveying direction AR by a predetermined unit conveyance distance.

The print control portion M40 may initiate printing in a plurality of printing modes, e.g., two, such as a high-speed printing mode and a high-resolution printing mode. Although a print speed in the high-resolution printing mode may be less than that in the high-speed printing mode, resolution in the conveying direction AR in the high-resolution printing mode may be twice as great as that in the high-speed printing mode.

The combination of the print control portion M40 and the printing portion 250 may correspond to a print executing portion. Each of the personal computer 100 and the control portion 210 of the multifunction peripheral 200 may correspond to a print data generating device.

The image processing process performed by the printer driver M20 of the personal computer 100, as depicted in FIG. 1, now is described with reference to FIG. 3.

First, in Step S10, the image data obtaining portion M21 may obtain image data representing an image to be printed (e.g., a print target image) from the application M10. The image data may comprise, for example, bitmap data, vector data representing graphics in a planar coordinate system, or data specifying letter or character information and location of letter or character.

In Step S20, the printer driver M20 may identify a printing mode. The application M10 may direct which printing mode is to be implemented, for example. The printing mode may be the high-speed printing mode or the high-resolution printing mode, as described above.

In Step S30, the image orientation selecting portion M22 may perform an image orientation selecting process in which one image orientation may be selected from a plurality of image orientations using a plurality of partial image data representing a plurality of partial images of the image.

Figure 4B:
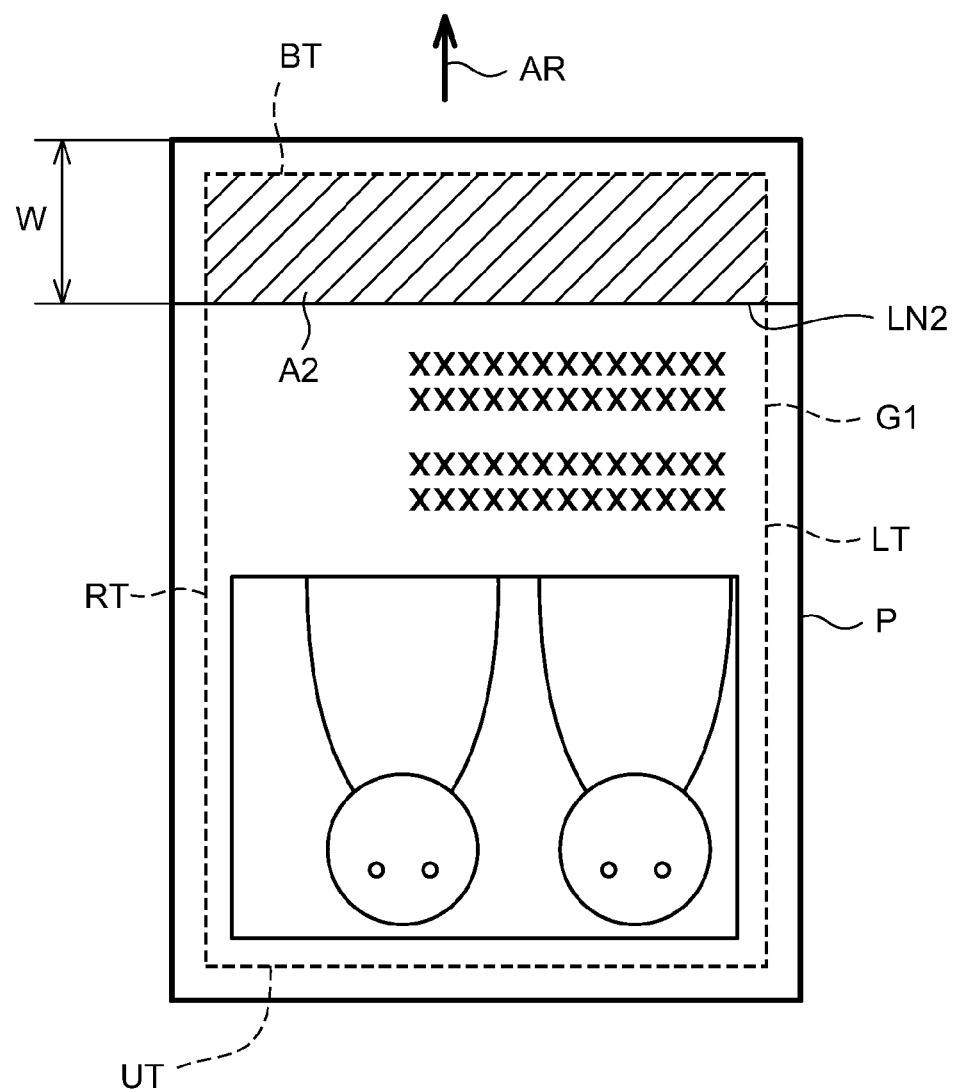
FIG. 4B depicts a sheet including an image in a second image orientation according to one or more embodiments of the invention.

With reference to FIGS. 4A-4D, the plurality of image orientations and the plurality of partial images now are described. The image orientation may be the orientation of an image to be printed with respect to the conveying direction AR. FIG. 4A depicts an example of a print target image represented by image data to be obtained by the image data obtaining portion M21. Hereinafter, upper, lower, right, and left edges of a print target image G1, as depicted in FIG. 4A, may be referred to as upper edge UT, lower edge BT, right edge RT, and left edge LT, regardless of the orientation of the print target image G1 with respect to the conveying direction AR. As depicted in FIGS. 4A-4D, the print target image G1 may be printed onto a sheet P, such that the upper edge UT and lower edge BT of the print target image G1 may be situated along respective shorter sides of the sheet P, and the right edge RT and left edge LT of the print target image G1 may be situated along respective longer sides of the sheet P.

Figure 4C:
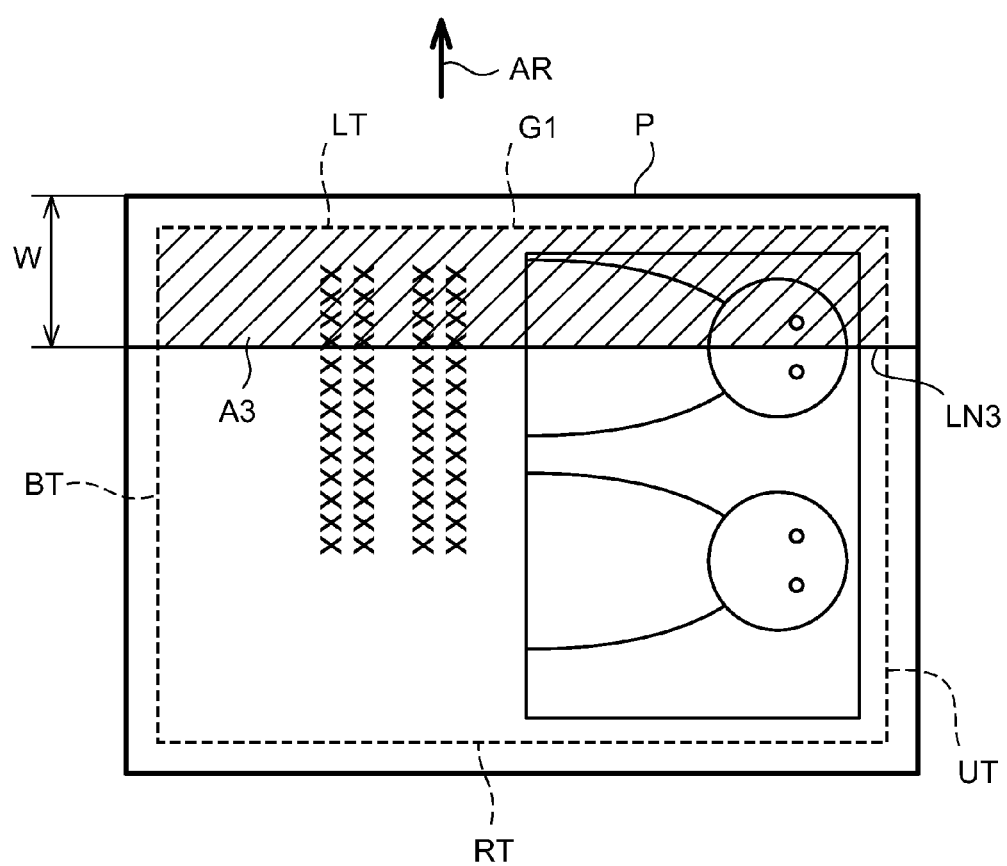
FIG. 4C depicts a sheet including an image in a third image orientation according to one or more embodiments of the invention.

The plurality of orientations of an image may comprise, for example, four orientations, i.e., a first image orientation E1, as depicted in FIG. 4A; a second image orientation E2, as depicted in FIG. 4B; a third image orientation E3, as depicted in FIG. 4C; and a fourth image orientation E4, as depicted in FIG. 4D. When the first image orientation E1 is selected, the print target image G1 may be printed onto a sheet P conveyed from the first sheet tray 20a, such that printing begins on a side of the sheet P corresponding to the upper edge UT of the print target image G1. When the second image orientation E2 is selected, the print target image G1 may be printed onto a sheet P conveyed from the first sheet tray 20a, such that printing begins on a side of the sheet P corresponding to the lower edge BT of the print target image G1. When the third image orientation E3 is selected, the print target image G1 may be printed onto a sheet P conveyed from the second sheet tray 20b, such that printing begins on a side of the sheet P corresponding to the left edge LT of the print target image G1.

When the fourth image orientation E4 is selected, the print target image G1 may be printed onto a sheet P conveyed from the second sheet tray 20b, such that printing begins on a side of the sheet P corresponding to the right edge RT of the print target image G1.

The print target image G1 may comprise the plurality of partial images, and the plurality of partial images may correspond to the first through fourth image orientations E1 through E4, respectively. In FIGS. 4A-4D, partial images A1, A2, A3, and A4 corresponding to the respective first through fourth image orientations E1 through E4 are represented by hatched regions.

The first partial image A1 may be an image to be printed in an area downstream from a phantom line LN1 in the conveying direction AR when the print target image G1 is printed onto a sheet P in the first image orientation E1, as depicted in FIG. 4A. Similarly, each of the second through fourth partial images A2 through A4 may be an image to be printed in an area downstream from each phantom line LN2, LN3, or LN4, respectively, in the conveying direction AR when the print target image G1 is printed onto a sheet P in the respective second, third, or fourth image orientation E2, E3, or E4, as depicted in FIGS. 4B-4D. A distance W from a leading edge of a sheet P in the conveying direction AR may be defined by each of the phantom lines LN1 through LN4 in each of the first through fourth image orientations E1 through E4. Each of the partial images A1 through A4 may have a length that may be the distance W between the leading edge of the sheet P and the corresponding one of phantom lines LN1 through LN4.

Figure 5:
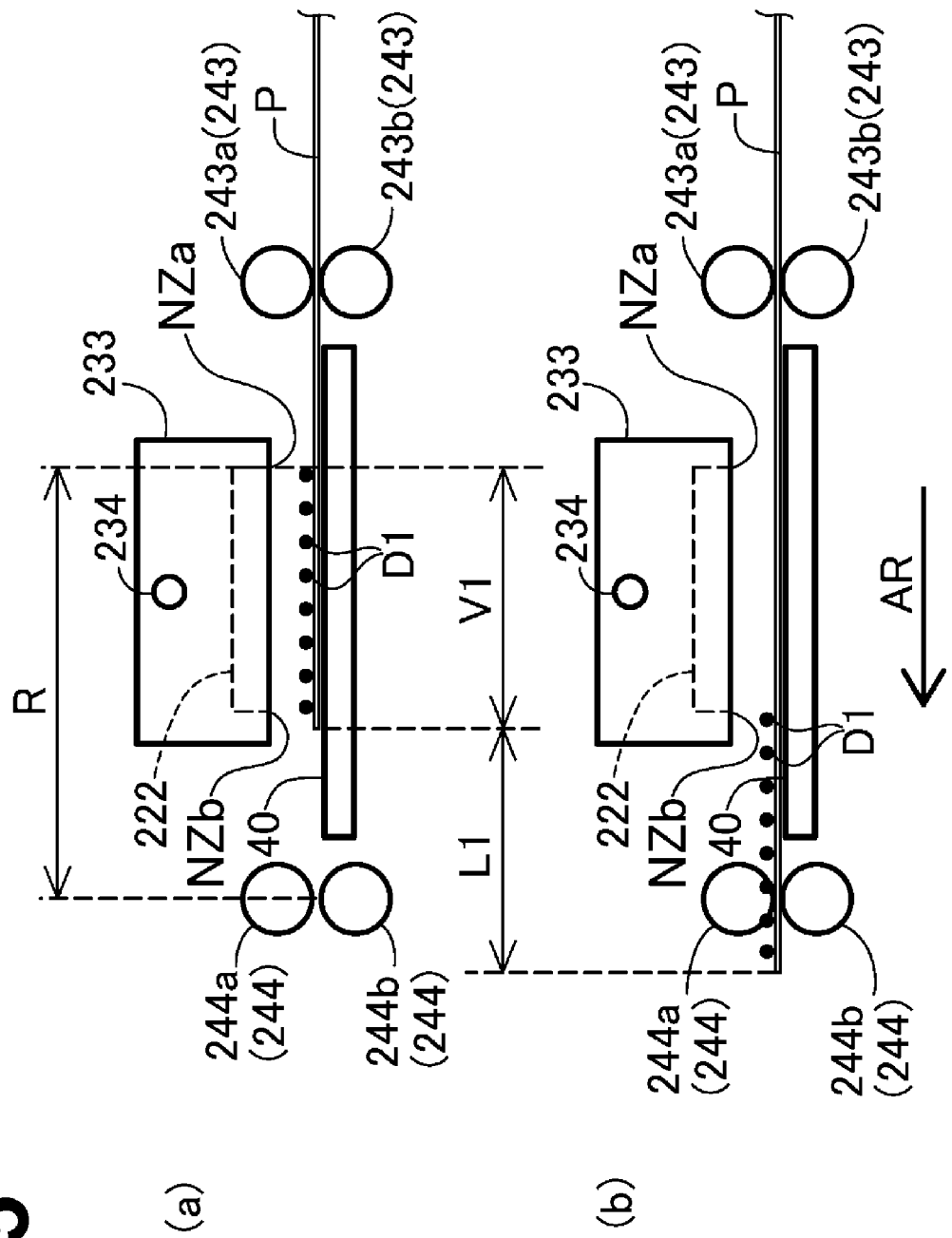
FIG. 5 depicts schematic views (a) and (b) illustrating a distance in a high-speed printing mode according to one or more embodiments of the invention.

The distance W for specifying each of the partial images A1 through A4 may be predetermined based on the printing mode. The distance W in the high-speed printing mode now is described with reference to FIG. 5. Schematic view (a) of FIG. 5 depicts a state in which the printing portion 250 completes a first unit printing in the high-speed printing mode. Schematic view (b) of FIG. 5 depicts a state in which the printing portion 250 completes a first unit conveyance in the high-speed printing mode after the state depicted in schematic view (a) of FIG. 5. A unit conveyance distance L1 in the high-speed printing mode may be substantially equal to a distance between the most-upstream nozzle NZa and the most-downstream nozzle NZb.

In the exemplary situation of FIG. 5, the downstream pinching portion 244 (i.e., the downstream conveyor roller 244a and the downstream following roller 244b) may pinch the leading edge (i.e., the downstream edge) of the sheet P in the conveying direction AR at the time when the printing portion 250 completes the first unit conveyance.

In the high-speed printing mode, a distance V1 between a most-upstream position (i.e., a position corresponding to the most-upstream nozzle NZa depicted in schematic view (a) of FIG. 5) and a certain downstream position of an area in the sheet P, in which printing may be performed by the first unit printing, may be defined as the distance W.

Figure 6:
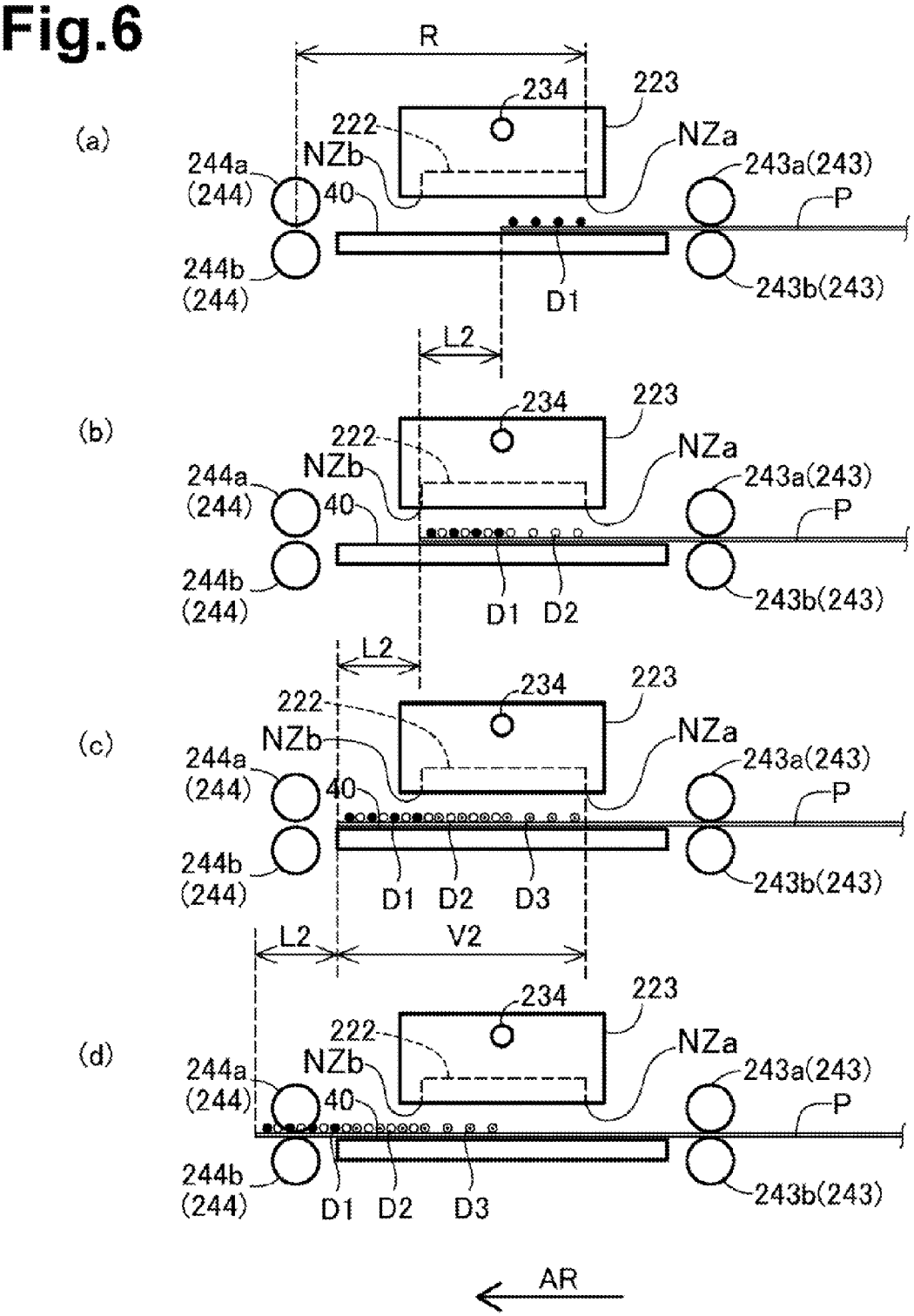
FIG. 6 depicts diagrams (a), (b), (c), and (d) illustrating a distance in a high-resolution printing mode according to one or more embodiments of the invention.

The distance W in the high-resolution printing mode now is described with reference to FIG. 6. Schematic view (a) of FIG. 6 depicts a state in which a first unit printing has been completed. Schematic view (b) of FIG. 6 depicts a state in which a first unit conveyance and a second unit printing have been completed after the state depicted in schematic view (a) of FIG. 6. Schematic view (c) of FIG. 6 depicts a state in which a second unit conveyance and a third unit printing have been completed after the state depicted in schematic view (b) of FIG. 6. Schematic view (d) of FIG. 6 depicts a state in which a third unit conveyance has been completed after the state depicted in schematic view (c) of FIG. 6. Dots D1, D2, and D3 may be formed during the first, second, and third unit printing, respectively.

In the high-resolution printing mode, alternating dotted lines may be printed during different unit printings. In particular, odd-numbered dotted lines and even-numbered dotted lines arranged in the main-scanning direction, as counted from the upstream side in the conveying direction AR of dotted lines, may be printed during different unit printings. Therefore, a unit conveyance distance L2 in the high-resolution printing mode may be about half of the unit conveyance distance L1 in the high-speed printing mode described above. In the exemplary situation of FIG. 6, the downstream pinching portion 244 may pinch the leading edge (i.e., the downstream edge) of the sheet P at the time when the printing portion 250 completes the third unit conveyance.

In the high-resolution printing mode, a distance V2 between a most-upstream position and a certain downstream position of an area of the sheet P, in which printing may be performed during the first through third unit printing, may be defined as the distance W, as depicted in schematic view (c) of FIG. 6.

The distance W may differ in accordance with a distance R. The distance R may be a distance between the most-upstream nozzle NZa formed in the print head 222 and the downstream pinching portion 244 (i.e., the downstream conveyor roller 244a) along the conveying distance AR, as depicted in schematic view (a) of FIG. 5 and schematic view (a) of FIG. 6. For example, in other embodiments, when a distance R is greater than the distance R depicted in schematic view (a) of FIG. 6, the downstream pinching portion 244 may not pinch the leading edge of the sheet P at the time when the printing portion 250 completes the third unit conveyance, but the downstream pinching portion 244 may pinch the leading edge of the sheet at the time when the printing portion 250 completes a fourth unit conveyance. In this configuration, a distance between a most-upstream position and a certain downstream position of an area in the sheet P, in which printing may be performed by the first through fourth unit printing, may be defined as the distance W, as depicted in schematic view (d) of FIG. 6.

Figure 7:
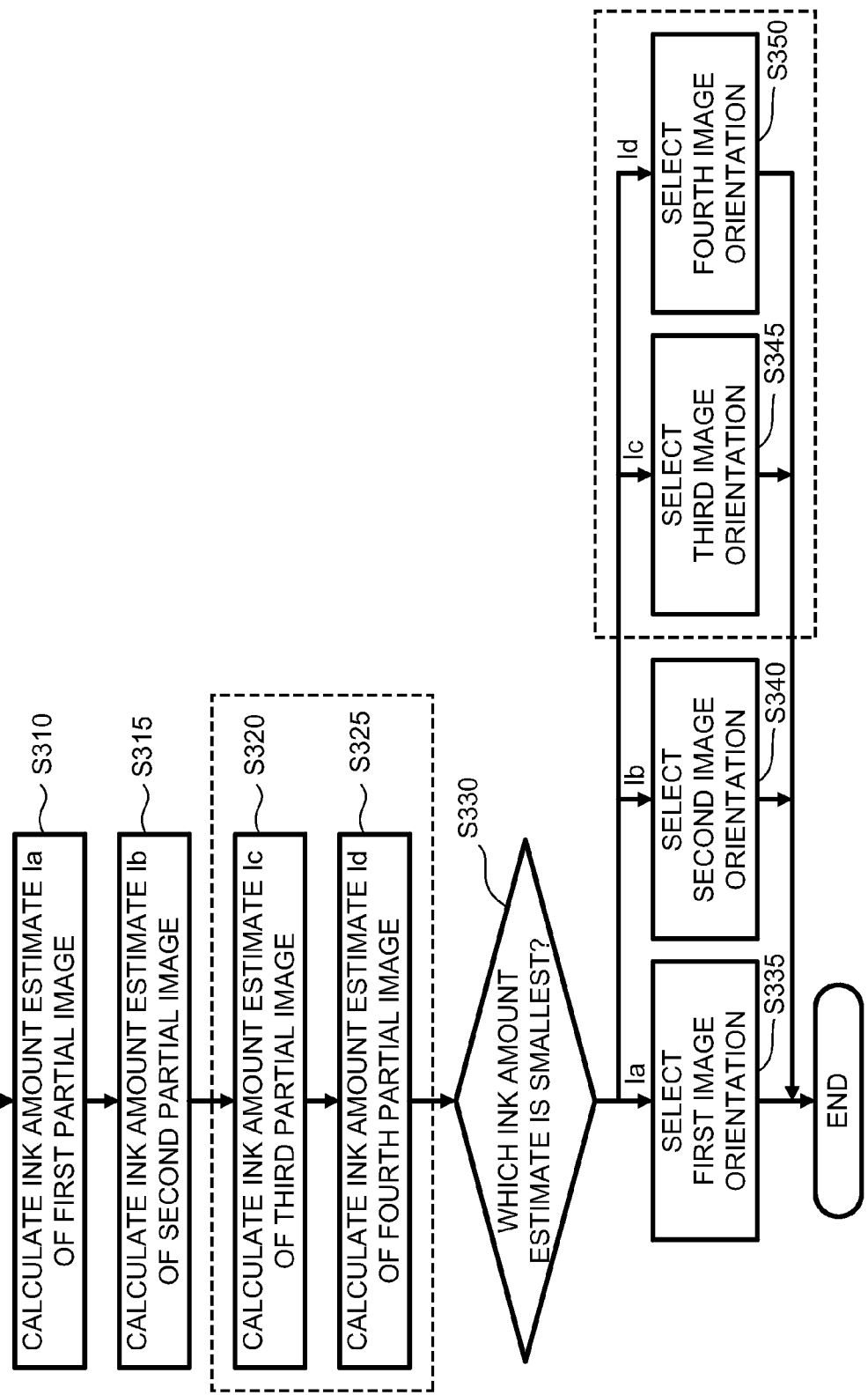
FIG. 7 is a flowchart of an image orientation selecting process in the image processing process of FIG. 3 according to one or more embodiments of the invention.

The image orientation selecting process in Step S30 of FIG. 3 now is described with reference to FIG. 7. In each of Steps S310, S315, S320, and S325, the image orientation selecting portion M22, as depicted in FIG. 1, may calculate each ink amount estimate value Ia, Ib, Ic, and Id which may represent an estimated amount of ink required for printing one of partial images A1, A2, A3, and A4, respectively, as depicted in FIGS. 4A-4D.

Each ink amount estimate value Ia, Ib, Ic, and Id may correlate positively with the amount of ink required for printing the corresponding one of partial image A1, A2, A3, and A4. The calculation of each ink amount estimate value Ia, Ib, Ic, and Id is described below.

In Step S330, the image orientation selecting portion M22 may determine which ink amount estimate value is the least among the ink amount estimate values Ia through Id. The selecting portion M22 may determine which partial image of the partial images A1 through A4 requires the least amount of ink for printing based on the ink amount estimate values Ia through Id.

The image orientation selecting portion M22 may select one image orientation from the image orientations E1 through E4 which corresponds to a partial image represented by the least ink amount estimate value as the image orientation to be used for printing. When the ink amount estimate value Ia is the least, the image orientation selecting portion M22 may select the first image orientation E1 in Step S335. When the ink amount estimate value Ib is the least, the image orientation selecting portion M22 may select the second image orientation E2 in Step S340. When the ink amount estimate value Ic is the least, the image orientation selecting portion M22 may select the third image orientation E3 in Step S345. When the ink amount estimate value Id is the least, the image orientation selecting portion M22 may select the fourth image orientation E4 in Step S350. When the image orientation selecting portion M22 has selected the image orientation for printing, the portion M22 may exit the image orientation selecting process.

In Step S40 of FIG. 3, the print data generating portion M23, as depicted in FIG. 1, may generate print data according to the selected image orientation during the print data generating process.

The print data generating process in Step S40 now is described with reference to FIG. 8. In Step S410, the print data generating portion M23 may perform a rasterization process in which image data representing the print target image G1 may be converted into bitmap data oriented to the selected image orientation. Pixel data constituting the bitmap data may be Red-Green-Blue ("RGB") pixel data in which pixel color may be represented by a color level, e.g., 256 color levels, in three elements of red ("R"), green ("G"), and blue ("B").

In Step S420, the print data generating portion M23 may perform a color conversion process in which the RGB pixel data constituting the bitmap data may be converted into Cyan-Magenta-Yellow-Black ("CMYK") pixel data in which pixel color may be represented by a color level, e.g., 256 color levels, in four elements of cyan ("C"), magenta ("M"), yellow ("Y"), and black ("B"). The print data generating portion M23 may perform the color conversion process using a lookup table, which may depict the correspondence of the RGB pixel data and the CMYK pixel data.

In Step S430, the print data generating portion M23 may perform a color correction process on each piece of CMYK pixel data constituting the bitmap data. The color correction process may comprise, for example, a calibration process and an ink amount adjustment process. During the calibration process, the value of each element of the CMYK pixel data may be corrected, such that a variation in the value of each element of the CMYK pixel data before the color correction process may result in a linear variation in the density of each color actually printed on the sheet P. In the ink amount adjustment process, the value of each element of the CMYK pixel data may be adjusted, such that the amount of ink required for printing may be less than or equal to a reference amount. Hereinafter, the CMYK pixel data may be referred to as corrected CMYK pixel data after print data generating portion M23 performs the color correction process on the CMYK pixel data.

In Step S440, the print data generating portion M23 may perform a halftone process in which the bitmap data consisting of the corrected CMYK pixel data may be converted into dot data representing a forming condition of ink dots per pixel.

In Step S450, the print data generating portion M23 may sort a plurality of dot data into the order in which the dot data is to be used in unit printing and may generate print data interpretable by the print control portion M40 of the multifunction peripheral 200 by adding various printer control codes and data identification codes to the print data.

In Step S50 of FIG. 3, the personal computer 100 may transmit the print data generated in Step S450 to the multifunction peripheral 200. The multifunction peripheral 200 may print the print target image G1 oriented according to the image orientation which the image orientation selecting portion M22 selected in Step S30.

The calculation method of the ink amount estimate values Ia through Id now is described. In Step S310 of FIG. 7, the image orientation selecting portion M22 may calculate the ink amount estimate value Ia by using the first partial image data representing the first partial image A1. In particular, the image orientation selecting portion M22 may select the first partial image data by performing processes similar to or the same as those corresponding to the print data generating process described in Steps S410 through S430, as depicted in FIG. 8. By doing so, the portion M22 may generate first partial image data in the bitmap format comprising the corrected CMYK pixel data.

The image orientation selecting portion M22 may calculate the ink amount estimate value Ia as a sum of values of the elements of the corrected CMYK pixel data constituting the first partial image data in the bitmap data format. The image orientation selecting portion M22 may calculate the ink amount estimate values Ib, Ic, and Id by using the second partial image data representing the second partial image A2, the third partial image data representing the third partial image A3, and the fourth partial image data representing the fourth partial image A4, respectively, in a manner similar to that used for the calculation of the ink amount estimate value Ia. Alternatively or additionally, the corrected CMYK pixel data used for the calculation of the ink amount estimate values Ia, Ib, Ic, and Id may be used to generate print data in the print data generation process, such that the process for generating corrected CMYK pixel data representing the partial images A1 through A4 may be omitted in the print data generation process.

The image orientation selecting portion M22 may select one image orientation for printing from the four image orientations by using the partial image data representing each of the respective four partial images A1 through A4 and corresponding to each of the respective four image orientations E1 through E4. The distance W defining each of the partial images A1 through A4 may be based on the distance R between the most-upstream nozzle NZa of the print head 222 and the downstream pinching portion 244 (i.e., the downstream conveyor roller 244a). Therefore, the image orientation selecting portion M22 may select one of the partial images A1 through A4 that comprises an area appropriate to the configuration of the printing portion 250, such that the multifunction device 200 may use the partial image data most suitable for preventing or reducing a conveyance failure. Accordingly, the image orientation selecting portion M22 efficiently may select the image orientation that may prevent or reduce conveyance failure, which efficiently may prevent or reduce conveyance failure from occurring.

Additionally or alternatively, the distance W may be based on the unit conveying distance L1 or L2, as depicted in FIGS. 5 and 6, according to the printing mode. Therefore, the personal computer 100 may use the appropriate partial image data for the print control settings repeatedly used during the unit printing and the unit conveyance and for the configuration of the printing portion 250. Accordingly, the personal computer 100 efficiently may prevent or reduce conveyance failure from occurring.

In particular, the distance W may be defined, such that images to be printed on the sheet P by the first unit printing through the nth unit printing immediately before the downstream pinching portion 244 pinches the leading edge (i.e., the downstream edge) of the sheet P may be specified as the partial images A1 through A4. The image (i.e., the image formed by the ejected ink), which is to be printed on the sheet P before the downstream pinching portion 244 pinches the downstream edge of the sheet P, may cause a conveyance failure, i.e., a paper jam, in the downstream pinching portion 244. On the other hand, an image (i.e., an image formed by the ejected ink), which is to be printed on the sheet P after the downstream pinching portion 244 pinches the downstream edge of the sheet P, may not cause a conveyance failure in the downstream pinching portion 244. Accordingly, when the distance W is determined as described above, the personal computer 100 may specify dimensions of the partial image, such that the dimensions of the partial image may be just enough to prevent or reduce a conveyance failure in the downstream pinching portion 244.

By printing an image in an orientation in which printing the partial image requires the least amount of ink, the multifunction peripheral 200 may reduce instances of deformation in the downstream part of the sheet P. Thus, the probability of a conveyance failure may decrease. In the above-described embodiments, the image orientation selecting portion M22 may calculate each ink amount estimate value Ia, Ib, Ic, and Id, which may represent an estimated amount of ink required for printing one of partial images A1, A2, A3, and A4, respectively, and the image orientation selecting portion M22 may select the image orientation based on the calculated ink amount estimate values Ia through Id. Therefore, the image orientation selecting portion M22 may select the image orientation that may prevent or reduce conveyance failures.

The image orientation selecting portion M22 may calculate the ink amount estimate values Ia through Id by using the partial image data converted into the corrected CMYK pixel data, which may be the pixel data on which the print data generating portion M23 has not performed the halftone process. Because the print data generating portion M23 has not performed the halftone process, which requires a high processing load, on the corrected CMYK pixel data, the image orientation selecting portion M22 may reduce a processing load on the CPU 110 when calculating the ink amount estimate values Ia through Id. Further, because the image orientation selecting portion M22 may calculate the ink amount estimate values Ia through Id by using the corrected CMYK pixel data, in which pixel color may be represented by a color level in four elements; the image orientation selecting portion M22 may estimate precisely the amount of ink required for printing the partial image. As a result, the image orientation selecting portion M22 may select properly the image orientation that may prevent or reduce conveyance failures. Note that the partial image data, which the print data generating portion M23 may convert into the corrected CMYK pixel data, may correspond to partial image data.

An image orientation selecting process according to other embodiments now is described with reference to FIG. 9. The image orientation selecting process according to the other embodiments may be different from that according to the above-described embodiments, in which Step S312 may occur between Step S310 and Step S315, Step S317 may occur between Step S315 and S320, and Step S322 may occur between Step S320 and Step S325. The other Steps performed in the image orientation selecting process according to the other embodiments may be the same as or similar to the corresponding Steps of the image orientation selecting process according to the above-described embodiments.

In Step S312, the image orientation selecting portion M22 may determine whether the ink amount estimate value Ia is less than a threshold value Ith. The threshold value Ith may be an upper limit of the ink amount for printing of the partial images A1 through A4, and the upper limit may be low enough to prevent or reduce conveyance failures. When the ink amount estimate value Ia is less than the threshold value Ith (YES in Step S312), the image orientation selecting portion M22 may select the first image orientation E1 in Step S335 without performing Steps S315 through S330. When the ink amount estimate value Ia is greater than or equal to the threshold value Ith (NO in Step S312), the image orientation selecting portion M22 may calculate the ink amount estimate value Ib in Step S315, and the process may proceed to Step S317.

In Step S317, the image orientation selecting portion M22 may determine whether the ink amount estimate value Ib is less than the threshold value Ith. When the ink amount estimate value Ib is less than the threshold value Ith (YES in Step S317), the image orientation selecting portion M22 may select the second image orientation E2 in Step S340 without performing Steps S320 through S330. When the ink amount estimate value Ib is greater than or equal to the threshold value Ith (NO in Step S317), the image orientation selecting portion M22 may calculate the ink amount estimate value Ic in Step S320, and the process may proceed to Step S322.

In Step S322, the image orientation selecting portion M22 may determine whether the ink amount estimate value Ic is less than the threshold value Ith. When the ink amount estimate value Ic is less than the threshold value Ith (YES in Step S322), the image orientation selecting portion M22 may select the third image orientation E3 in Step S345 without performing Steps S325 and S330. When the ink amount estimate value Ic is greater than or equal to the threshold value Ith (NO in Step S322), the image orientation selecting portion M22 may calculate the ink amount estimate value Id in Step S325, and the process may proceed to Step S330.

As described above, in the image orientation selecting process according to the other embodiments, when the amount of ink required for printing the first partial image A1 is less than the threshold value, the image orientation selecting portion M22 may select the corresponding image orientation that may prevent or reduce conveyance failures, without calculating the other ink amount estimate values Ib, Ic, and Id using the partial image data representing the corresponding partial images A2, A3, and A4. As a result, the image orientation selecting portion M22 may have a lower processing load when the amount of ink required for printing the first partial image A1 is relatively low.

When the amount of ink required for printing the second partial image A2 is less than the threshold value, the image orientation selecting portion M22 may select the image orientation that may prevent or reduce conveyance failures without calculating the other ink amount estimate values Ic and Id. As a result, the image orientation selecting portion M22 may have a reduced processing load compared to a scenario where the image orientation selecting portion M22 calculates the other ink amount estimate values Ic and Id. When the amount of ink required for printing the third partial image A3 is less than the threshold value, the image orientation selecting portion M22 may select the image orientation that may prevent or reduce conveyance failures without calculating the ink amount estimate values Id. As a result, the image orientation selecting portion M22 may have a reduced processing load compared to a scenario where the image orientation selecting portion M22 calculates the other ink amount estimate values Id.

The invention may not be limited to the above-described specific embodiments. Accordingly, the invention may be implemented in various modifications without departing from the scope and spirit of the invention.

Modification 1

The image orientation selecting process according to the above-described embodiments may be adopted for borderless printing, in which an image may be formed on a sheet P, such that no blank space exists around the edges of sheet P. Partial images to be used for borderless printing now are described with reference to FIGS. 10A and 10B.

Figure 10A:
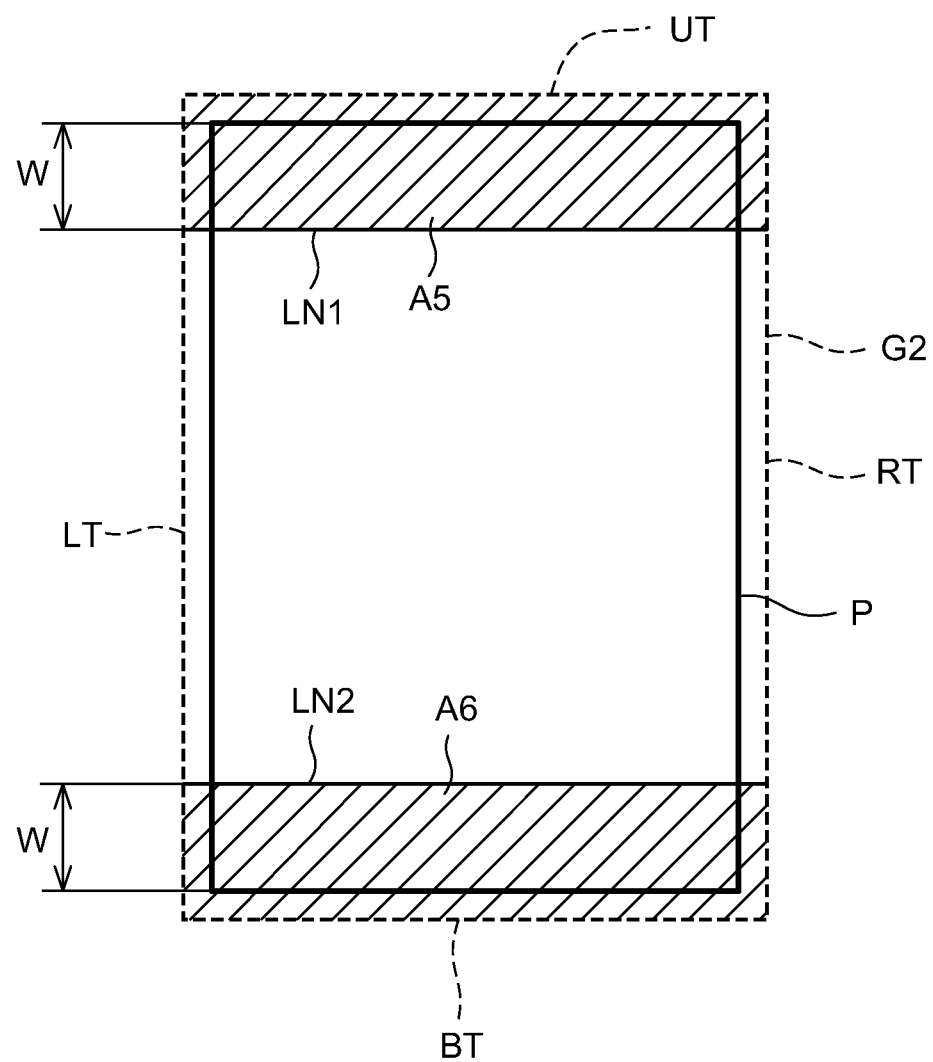
FIGS. 10A and 10B depict sheets including partial images for borderless printing according to one or more embodiments of the invention.
Figure 10B:
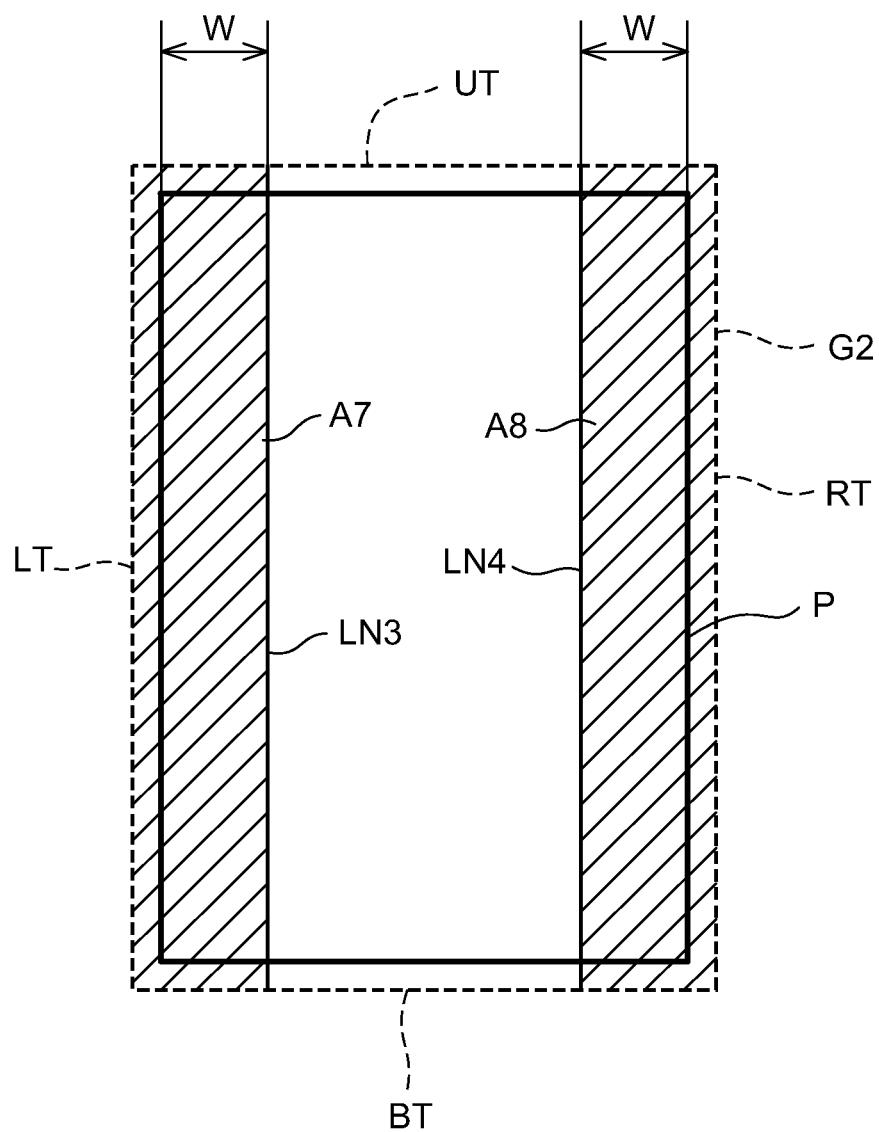

FIG. 10A depicts a relationship between a sheet P and a print target image G2 represented by image data for borderless printing. During borderless printing, one or more of the multifunction peripheral 200 and the personal computer 200 may prepare image data representing the print target image G2, which may be slightly greater than the sheet P. By doing so, the multifunction peripheral 200 may print the image on the sheet P with no blank space around its edges, even when the sheet P deviates from an intended position during conveyance. During borderless printing, a partial image may be an image to be printed in an area downstream from a position that may be separated from the downstream edge of the sheet P by the distance W in the conveying direction AR when the print target image G2 is to be printed in a corresponding image orientation onto a sheet P. For example, as depicted in FIG. 10A, a first partial image A5 of the print target image G2 may be an image defined between an upper edge UT and a phantom line LN1 in the print target image G2, and a second partial image A6 of the print target image G2 may be an image defined between a lower edge BT and a phantom line LN2 in the print target image G2. As depicted in FIG. 10B, a third partial image A7 of the print target image G2 may be an image defined between a left edge LT and a phantom line LN3 in the print target image G2, and a fourth partial image A8 of the print target image G2 may be an image defined between a right edge RT and a phantom line LN4 in the print target image G2.

Therefore, in the borderless printing, the image orientation selecting portion M22 may efficiently select an appropriate image orientation by using the plurality of partial image data representing the plurality of partial images A5 through A8, as depicted in FIGS. 10A and 10B, in a manner similar to the above-described embodiments.

Modification 2

In the above-described embodiments, the image orientation selecting portion M22 may select an appropriate image orientation for printing from the four image orientations. Alternatively, the image orientation selecting portion M22 may select an appropriate image orientation for printing from two image orientations, such as the first image orientation E1, as depicted in FIG. 4A, and the second image orientation E2, as depicted in FIG. 4B. In this configuration, for example, the image orientation selecting portion M22 may perform the Steps of the image orientation selecting process according to the above-described embodiments, except for the Steps enclosed by a dashed line in FIG. 7, i.e., Steps S320, S325, S345, and S350. Alternatively, the portion image orientation selecting M22 may perform the Steps of the image orientation selecting process according to the other embodiments, other than Steps enclosed by a dashed line in FIG. 9, i.e., Steps S317, S320, S322, S325, S345, and S350. In further embodiments, for example, the image orientation selecting portion M22 may select an appropriate image orientation for printing from the third image orientation E3, as depicted in FIG. 4C, and the fourth image orientation E4, as depicted in FIG. 4D.

By doing so, the image orientation selecting portion M22 may efficiently and precisely select an image orientation that may prevent or reduce conveyance failures from the two image orientations that may be 180-degree rotations from each other. Accordingly, for example, even when the sheet P, e.g., an A4-sized sheet, may be conveyed only with its longer sides parallel to the conveying direction AR or the sheet P may be conveyed only with its shorter sides parallel to the conveying direction AR, conveyance failures may be reduced efficiently.

Modification 3

When a single partial image comprises a plurality of images to be printed by several unit printings (hereinafter, referred to as a "unit image"), such as during the high-resolution printing mode, the image orientation selecting portion M22 may assign weights to a plurality of unit image data representing the plurality of respective unit images. The image orientation selecting portion M22 may assign a greater weight to the unit image data representing a unit image to be printed earlier in printing order. The probability that a unit image printed earlier may deform the sheet P and may cause conveyance failure in the downstream pinching portion 244 may be greater than the probability that a unit image printed later may deform the sheet P and may cause conveyance failure in the downstream pinching portion 244.

For example, when a single partial image comprises the unit images to be printed by the first through nth unit printings, the image orientation selecting portion M22 may obtain an ink amount estimate value Im of the partial image using Expression 1, which is depicted below.

$$Im = \sum_{k=1}^{n} (W_k \times I_k) \ (W_k > W_{k+1})$$ Expression 1

"$I_k$" may represent an ink amount estimate value of a unit image to be printed by the kth unit printing, and "$W_k$" may represent a weighting factor for the unit image to be printed by kth unit printing.

When the image orientation selecting process is performed by using the ink amount estimate value Im of the partial image obtained in the manner described above, the image orientation selecting portion M22 may select appropriately an image orientation that may prevent or reduce conveyance failures.

Modification 4

In the above-described embodiments, the image orientation selecting portion M22 may use the corrected CMYK pixel data of the pixels constituting the partial image to determine the ink amount estimate value of the partial image. The invention is not be limited to the specific embodiments described above. In still other embodiments, for example, the image orientation selecting portion M22 may use dot data generated during the halftone process performed on the corrected CMYK pixel data (Step S440, as depicted in FIG. 8 to determine the ink amount estimate value of the partial image. When dot data comprises two color levels, e.g., "on" (i.e., a dot may be formed) and "off" (i.e., a dot may not be formed), the image orientation selecting portion M22 may adopt the total number of dots to be formed based on the dot data of the pixels constituting a partial image as the ink amount estimate value. When dot data representing "on" indicates a dot forming condition of, for example, three sizes of small, medium, and large, the image orientation selecting portion M22 may calculate the ink amount estimate value by assigning weights based on one or more of the dot size and the amount of ink required for formation of the dot. In this configuration, the partial image data converted into the dot data may correspond to partial image data.

By doing so, the image orientation selecting portion M22 may calculate the ink amount estimate value using the dot data directly representing the ink amount. Therefore, the image orientation selecting portion M22 may estimate more precisely the ink amount required for printing the partial images. Accordingly, the image orientation selecting portion M22 may select appropriately the image orientation that may prevent or reduce conveyance failures.

Figure 8:
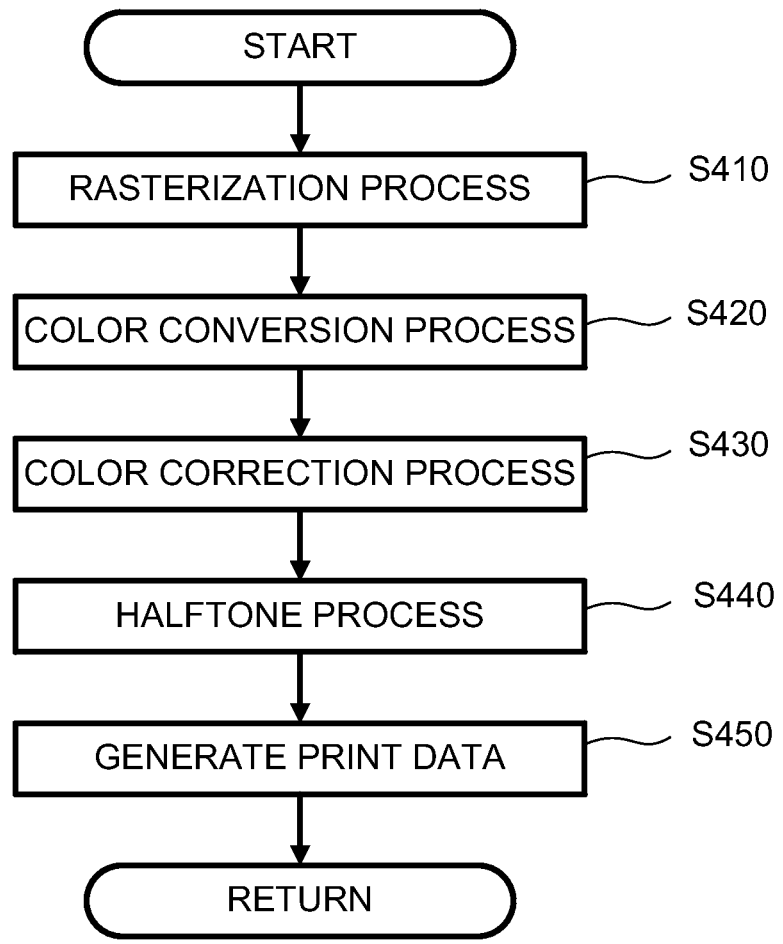
FIG. 8 is a flowchart of a print data generating process in the image processing process of FIG. 3 according to one or more embodiments of the invention.

In still further embodiments, the image orientation selecting portion M22 may calculate the ink amount estimate value using the RGB pixel data of the pixels constituting the partial image (Step S410, as depicted in FIG. 8). For example, the image orientation selecting portion M22 may adopt the sum of the values of the elements of the RGB pixel data, which corresponds to the pixels constituting the partial image, as the ink amount estimate value. In this configuration, the image amount estimate may be negatively correlated with the amount of ink required for printing the partial image. Accordingly, as the ink amount estimate value decreases, the amount of ink required for printing the partial image may increase. Therefore, when the image orientation selecting portion M22 calculates the ink amount estimate value as described above, the image orientation selecting portion M22 may select an image orientation for printing that may correspond to a partial image corresponding to the largest ink amount estimate value during Steps S330 through S350 of the image orientation selecting process, as depicted in FIG. 7 or 9. The image orientation selecting portion M22 may determine a pixel estimate on a pixel basis (e.g., estimates of five to ten pixel levels), wherein the pixel estimate may decrease as the sum of the values of the elements of the RGB pixel data increase, and the pixel estimate may increase as the sum of the values of the elements of the RGB pixel data decrease. The image orientation selecting portion M22 may calculate the sum of the pixel estimates of the pixels constituting the partial image as the ink amount estimate value. In this configuration, the partial image data constituting the RGB pixel data may correspond to partial image data.

Modification 5

In the above-described embodiments, the distance W, as depicted in FIG. 4, which may specify each of the partial images, may be based on both the distance R and the unit conveyance distance L1 or L2, as depicted in FIGS. 5 and 6. Alternatively, the distance W may be based on the distance R, rather than on both the distance R and the unit conveyance distance L1 or L2. For example, the distance W may be the same as the distance R. Generally, the distance W may be based on the distance between the most-upstream nozzle NZa of the plurality of nozzles in the print head 222 and the downstream rollers 244a and 244b for pinching and conveying the sheet P at the position downstream from the print head 222.

Modification 6

The distance W specifying each of the partial images may be the same as the distance V1 or V2 in the above-described embodiments, but the distance W may be set to various values based on the distance R, which may be the distance between the most-upstream nozzle NZa and the downstream conveyor roller 244a, and the unit conveyance distance L1 or L2. For example, the distance W may be may be determined in view of two considerations. A first consideration is that incorporating an image, which may be printed before a downstream edge of a sheet P is pinched by the downstream conveyor roller 244a, into a partial image may increase the precision with which the image orientation selecting portion M22 selects an image orientation. A second consideration is that preventing incorporation of an image, which is unrelated to a cause of conveyor failure in the downstream conveyor roller 244a, into a partial image may decrease a processing load of the image orientation selecting portion M22. The downstream conveyor roller 244a may not pinch the downstream edge of the sheet P when the upstream conveyor roller 243a conveys the sheet P the unit conveying distance L from a position where the downstream edge of the sheet P is located upstream from the downstream conveyor roller 244a at a distance more than the unit conveying distance L. In view of the first consideration, the distance W may be greater than a distance (i.e., a distance R-L) which equals the distance L subtracted from the distance R. The downstream conveyor roller 244a may pinch the downstream edge of the sheet P when the most-upstream nozzle NZa is disposed at a position on the sheet P at a distance (i.e., a distance R+L), which equals the sum of the distances R and L, from the downstream edge of the sheet P. In view of the second consideration, the distance W may be less than the distance R+L. Accordingly, for example, the distance W may be a distance within a range given by: (R−L)<W<(R+L).

A configuration now is described in which the downstream conveyor roller 244a may not pinch the downstream edge of the sheet P at the time of the completion of nth unit conveyance, but in which the downstream conveyor roller 244a may pinch the downstream edge of the sheet P at the time of the completion of (n+1)th unit conveyance. In view of the two considerations, when the downstream edge of the sheet P at the time of the completion of nth unit conveyance is disposed upstream from the downstream conveyor roller 244a at a distance A and the downstream edge of the sheet P at the time of the completion of (n+1)th unit conveyance is disposed downstream from the downstream conveyor roller 244a at a distance B, the distance W may be a distance within a range given by: (R−A)<W<(R+B), where the distance L is equal to the sum of the distances A and B (i.e., A+B=L).

Modification 7

In additional embodiments, the image orientation selecting portion M22 may calculate the ink amount estimate value using the pixel data of a portion of the pixels constituting the partial image. In particular, the image orientation selecting portion M22 may calculate each of the ink amount estimate values Ia through Id using the pixel data of the odd-numbered pixel lines counted from the upper edge UT of the print target image G1, and the image orientation selecting portion M22 may not use the pixel data of the even-numbered pixel lines counted from the upper edge UT of the print target image G1. As described above, the portion M22 may calculate the ink amount estimate value of the partial image by using the pixel data of the portion of the pixels appropriately selected from the pixels constituting the partial image. In this configuration, the image orientation selecting portion M22 may calculate the ink amount estimate value using the pixel data of the pixels selected consistently from the entire partial image, such that the image orientation selecting portion M22 may use statistical methods to determine the ink amount estimate value from the estimation of the amount of ink required for printing the entire partial image. Generally, the image orientation selecting portion M22 may select an appropriate image orientation by using the plurality of partial image data that may represent the plurality of respective partial images, which may be parts of the image data representing the print target image G1, and which may correspond to the plurality of respective image orientations.

Modification 8

In the above-described embodiments, the printing portion 250 of the multifunction peripheral 200 may print using ink of the four colors: cyan, magenta, yellow, and black. Nevertheless, in further additional embodiments, the printing portion 250 may print using ink of six colors, e.g., the above-described four colors and light cyan ("LC") and light magenta ("LM"). In this configuration, partial image data to be used for the calculation of the ink amount estimate values of the partial images may comprise pixel data comprising six elements, each element representing one of the respective colors of ink (e.g., pixel data comprising six elements of cyan, magenta, yellow, black, light cyan, and light magenta).

Modification 9

In the above-described embodiments, the image orientation selecting portion M22 may use the total sum of the elements of the pixel data of the pixels constituting the partial image (i.e., the estimate indicating the total amount of ink required for printing the partial image) as the ink amount estimate value in the image orientation selecting process. Nevertheless, in still further additional embodiments, the image orientation selecting portion M22 may adopt an estimate indicating the amount of ink required for printing the partial image per unit area (i.e., the density of ink to be printed) as the ink amount estimate value. For example, the image orientation selecting portion M22 may use a value obtained by dividing the total sum of the elements of the pixel data of the pixels, which constitute the partial image, by the number of pixels as the ink amount estimate value.

Modification 10

The image orientation selecting portion M22 may select an image orientation using characteristics of the sheet P in addition to the ink amount estimate values. For example, the image orientation selecting portion M22 may select an image orientation using a value obtained by multiplying the ink amount estimate value by a characteristic coefficient based on the characteristics of the sheet P.

For example, the image orientation selecting portion M22 may use paper grain direction of the sheet P as the characteristic for determining the characteristic coefficient. The paper grain direction may refer to a direction in which fibers constituting the paper may extend linearly. For example, two types of paper grain printing configurations may exist. During a long-grain printing, the multifunction peripheral 200 may print on a sheet P which may be conveyed with the long grain extending in a direction parallel to the conveying direction AR. During a short-grain printing, the multifunction peripheral 200 may print on a sheet P which may be conveyed with the long grain extending in a direction perpendicular to the conveying direction AR. Instances of deformation of sheet P may be infrequent during the long-grain printing, as compared to instances of deformation of sheet P during the short-grain printing. Therefore, conveyance failures may be reduced during the long-grain printing. Accordingly, the image orientation selecting portion M22 may use a characteristic coefficient for the long-grain printing, such that the amount of ink represented by the ink amount estimate value may be less than that for short-grain printing. Thus, a characteristic coefficient corresponding to long-grain printing may be less than a characteristic coefficient corresponding to short-grain printing.

Modification 11

Alternatively, a part of the configuration implemented by hardware in the above-described embodiments may be implemented by software. Further, a part of the configuration implemented by software in the above-described embodiments may be implemented by hardware.

While the invention has been described in connection with various example structures and illustrative embodiments, it will be understood by those skilled in the art that other variations and modifications of the structures, configurations, and embodiments described above may be made without departing from the scope of the invention. For example, this application comprises any possible combination of the various elements and features disclosed herein, and the particular elements and features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A printing device comprising:
a print executing portion comprising a conveying mechanism and a print head,
wherein the conveying mechanism is configured to convey a printing medium in a conveying direction,
wherein the conveying mechanism comprises a downstream roller configured to pinch and convey the printing medium at a position downstream from the print head, and
wherein the print head comprises a plurality of nozzles and is configured to eject ink from the plurality of nozzles onto the printing medium;
an image orientation selecting portion configured to select one image orientation of an image to be printed from a plurality of image orientations by using a plurality of partial image data; and
a print data generating portion configured to generate print data for printing the image according to the one selected image orientation,
wherein each image orientation of the plurality of image orientations is with respect to the conveying direction,
wherein each partial image data of the plurality of partial image data corresponds to a respective image orientation of the plurality of image orientations, a respective partial image of a plurality of partial images, and a respective portion of the image to be printed,
wherein each partial image of the plurality of partial images is less than an entirety of the image to be printed and is configured to be printed in an area defined by a particular distance determined from a corresponding edge of the printing medium,
wherein the particular distance is based on a standard distance between the downstream roller and a most-upstream nozzle of the plurality of nozzles in the print head,
wherein the particular distance is less than or equal to the standard distance,
wherein the particular distance is greater than a distance between the most-upstream nozzle of the plurality of nozzles in the print head and a most-downstream nozzle of the plurality of nozzles in the print head,
wherein the most-upstream nozzle of the plurality of nozzles in the print head is the most-upstream nozzle of the plurality of nozzles in the conveying direction,
wherein the most-downstream nozzle of the plurality of nozzles in the print head is the most-downstream nozzle of the plurality of nozzles in the conveying direction,
wherein the image orientation selecting portion is further configured to:
calculate a first estimate of a first ink amount required to print a first partial image represented by a first partial image data by using the first partial image data corresponding to a first image orientation of the plurality of image orientations;
select the first image orientation when the first estimate indicates that the first ink amount is less than a threshold value;
calculate a second estimate of a second ink amount required to print a second partial image represented by a second partial image data by using the second partial image data corresponding to a second image orientation of the plurality of image orientations when the first estimate of the first ink amount indicates that the first ink amount is greater than the threshold value; and
select the second image orientation when the second estimate indicates that the second ink amount is less than the threshold value.

2. The print data generating device according to claim 1, wherein the print executing portion is configured to alternately repeat unit printing and unit conveyance,
wherein the print head is configured to print while the conveying mechanism has stopped conveying the printing medium during the unit printing,
wherein the conveying mechanism is configured to convey the printing medium by a unit conveying distance during the unit conveyance, and
wherein the particular distance also is based on the unit conveying distance.

3. The print data generating device according to claim 1, wherein the print executing portion is configured to alternately repeat unit printing and unit conveyance,
wherein the print head is configured to print while the conveying mechanism has stopped conveying the printing medium during the unit printing,
wherein the conveying mechanism is configured to convey the printing medium by a unit conveying distance during the unit conveyance,
wherein each of the plurality of partial image data comprises a plurality of unit image data representing a plurality of unit images to be printed during a plurality of unit printings, and
wherein the image orientation selecting portion is configured to select the one image orientation by using weighting factors assigned to the plurality of unit image data, such that the unit image data corresponding to a unit image to be printed earlier in printing order is assigned a greater weighting factor than a weighting factor of unit image data corresponding to a unit image to be printed later in printing order.

4. The print data generating device according to claim 1, wherein the partial image data used to select the image orientation comprises pixel data in which pixels constituting the partial images are represented by a color level of each of a plurality of colors of ink to be used for printing; and
wherein the number of color levels of the pixel data is greater than a number of color levels of dot data representing a dot forming condition per pixel.

5. The print data generating device according to claim 1, wherein the partial image data used to select the image orientation comprises dot data representing a forming condition of dots to be formed by ejecting ink when the partial image is printed.

6. The print data generating device of claim 1, wherein the particular distance is less than the distance between the location of the most-upstream nozzle and the location of the downstream roller for the printer in the conveying direction.

7. The print data generating device of claim 1,
wherein the image to be printed comprises a first side,
wherein the image orientation selecting portion is configured to select one of the first image orientation and the second image orientation,
wherein the first image orientation is an orientation of the image in which the first side of the image is oriented perpendicular to the conveying direction and is to be a side of the image printed first, and wherein the second orientation is an orientation of the image in which the first side of the image is oriented perpendicular to the conveying direction and is a side of the image to be printed last.

8. The print data generating device of claim 7,
wherein the image to be printed comprises a second side, and
wherein a length of the second side of the image to be printed is less than a length of the first side of the image to be printed.

9. The print data generating device of claim 1,
wherein the image to be printed comprises a first side and a second side,
wherein a length of the first side of the image to be printed is less than a length of the second side of the image to be printed,
wherein the image orientation selecting portion is configured to select one of the first image orientation, the second image orientation, a third image orientation, and a fourth image orientation from the plurality of image orientations,
wherein the first image orientation is an orientation of the image in which the first side of the image is oriented perpendicular to the conveying direction and is to be a side of the image printed first,
wherein the second image orientation is an orientation of the image in which the first side of the image is oriented perpendicular to the conveying direction and is a side of the image to be printed last,
wherein the third image orientation is an orientation of the image in which the second side of the image is oriented perpendicular to the conveying direction and is a side of the image to be printed first, and
wherein the fourth image orientation is an orientation of the image in which the second side of the image is oriented perpendicular to the conveying direction and is the side of the image to be printed last.

10. A non-transitory, computer-readable storage medium comprising computer-readable instructions for a processor of a print data generating device, the computer-readable instructions instructing the processor to perform the steps of:
selecting one image orientation of an image to be printed from a plurality of image orientations by using a plurality of partial image data; and
generating print data for printing the image according to the one selected image orientation,
wherein each image orientation of the plurality of image orientations is with respect to a printing-medium conveying direction,
wherein each partial image data of the plurality of partial image data corresponds to a respective image orientation of the plurality of image orientations, a respective partial image of a plurality of partial images, and a respective portion of the image to be printed,
wherein each partial image of the plurality of partial images is less than an entirety of the image to be printed and is configured to be printed in an area defined by a particular distance determined from a corresponding edge of a printing medium,
wherein the particular distance is based on a standard distance between a location of a most-upstream nozzle and a location of a downstream roller for a printer in the printing-medium conveying direction,
wherein the particular distance is less than or equal to the standard distance,
wherein the particular distance is greater than a distance between the most-upstream nozzle and a most-downstream nozzle for the printer in the printing-medium conveying direction,
wherein selecting the one image orientation comprises:
calculating a first estimate of a first ink amount required to print a first partial image represented by a first partial image data by using the first partial image data corresponding to a first image orientation of the plurality of image orientations;
selecting the first image orientation when the first estimate indicates that the first ink amount is less than a threshold value;
calculating a second estimate of a second ink amount required to print a second partial image represented by a second partial image data by using the second partial image data corresponding to a second image orientation of the plurality of image orientations when the first estimate of the first ink amount indicates that the first ink amount is greater than the threshold value; and
selecting the second image orientation when the second estimate indicates that the second ink amount is less than the threshold value.

11. The non-transitory, computer-readable storage medium comprising computer-readable instructions according to claim 10, wherein the particular distance also is based on a unit conveying distance for the printer in the printing-medium conveying direction.

12. The non-transitory, computer-readable storage medium comprising computer-readable instructions according to claim 10,
wherein each of the plurality of partial image data comprises a plurality of unit image data representing a plurality of unit images to be printed during a plurality of unit printings, and
wherein the selecting step comprises:
assigning weighting factors to each unit image data of the plurality of unit image data, such that unit image data corresponding to a unit image to be printed earlier in printing order is assigned a greater weighting factor than a weighting factor of unit image data corresponding to a unit image to be printed later in printing order, and
selecting the one image orientation by using the weighting factors assigned to each unit image data of the plurality of unit image data.

13. The printing device according to claim 1,
wherein the conveying mechanism is configured to convey the printing medium in the conveying direction a unit distance during each of one or more unit conveyances,
wherein the particular distance is equal to a greatest sum of the unit distances of each of the one or more unit conveyances that does not exceed the distance between the downstream roller and the most-upstream nozzle of the plurality of nozzles in the print head.

14. The printing device according to claim 13,
wherein the unit distance is substantially equal to distance between the most-upstream nozzle of the plurality of nozzles in the print head and the most-downstream nozzle of the plurality of nozzles in the print head when the printing device is set to a first printing mode, and
wherein the unit distance is less than the distance between the most-upstream nozzle of the plurality of nozzles in the print head and the most-downstream nozzle of the plurality of nozzles in the print head when the printing device is set to a second printing mode.

15. The printing device according to claim 14, wherein the first printing mode is a high-speed printing mode and the second printing mode is a high-resolution printing mode.

16. A printing device comprising:
a print executing portion comprising a conveying mechanism and a print head,
  wherein the conveying mechanism is configured to convey a printing medium in a conveying direction,
  wherein the conveying mechanism comprises a downstream roller configured to pinch and convey the printing medium at a position downstream from the print head, and
  wherein the print head comprises a plurality of nozzles and is configured to eject ink from the plurality of nozzles onto the printing medium;
an image orientation selecting portion configured to select one image orientation of an image to be printed from a plurality of image orientations by using a plurality of partial image data; and
a print data generating portion configured to generate print data for printing the image according to the one selected image orientation,
wherein each image orientation of the plurality of image orientations is with respect to the conveying direction,
wherein each partial image data of the plurality of partial image data corresponds to a respective image orientation of the plurality of image orientations, a respective partial image of a plurality of partial images, and a respective portion of the image to be printed,
wherein each partial image of the plurality of partial images is less than an entirety of the image to be printed and is configured to be printed in an area defined by a particular distance determined from a corresponding edge of the printing medium,
wherein the particular distance is based on a standard distance between the downstream roller and a most-upstream nozzle of the plurality of nozzles in the print head,
wherein the particular distance is less than or equal to the standard distance,
wherein the particular distance is greater than a distance between the most-upstream nozzle of the plurality of nozzles in the print head and a most-downstream nozzle of the plurality of nozzles in the print head,
wherein the most-upstream nozzle of the plurality of nozzles in the print head is the most-upstream nozzle of the plurality of nozzles in the conveying direction,
wherein the most-downstream nozzle of the plurality of nozzles in the print head is the most-downstream nozzle of the plurality of nozzles in the conveying direction,
wherein the image to be printed comprises a first side and a second side,
wherein a length of the first side of the image to be printed is less than a length of the second side of the image to be printed,
wherein the image orientation selecting portion is configured to select one of a first image orientation, a second image orientation, a third image orientation, and a fourth image orientation from the plurality of image orientations,
wherein the first image orientation is an orientation of the image in which the first side of the image is oriented perpendicular to the conveying direction and is to be a side of the image printed first,
wherein the second image orientation is an orientation of the image in which the first side of the image is oriented perpendicular to the conveying direction and is a side of the image to be printed last,
wherein the third image orientation is an orientation of the image in which the second side of the image is oriented perpendicular to the conveying direction and is a side of the image to be printed first, and
wherein the fourth image orientation is an orientation of the image in which the second side of the image is oriented perpendicular to the conveying direction and is the side of the image to be printed last.

17. The print data generating device according to claim 16, wherein the image orientation selecting portion is configured to:
estimate a plurality of amounts of ink required to print the plurality of partial images by using the plurality of partial image data corresponding to the plurality of image orientations, respectively; and
select the one image orientation from the plurality of image orientations based on the estimated plurality of amounts of ink.

18. The print data generating device according to claim 16, wherein the image orientation selecting portion is configured to:
calculate a first estimate of a first ink amount required to print a first partial image represented by a first partial image data by using the first partial image data corresponding to the first image orientation of the plurality of image orientations, and
select the first image orientation when the first estimate indicates that the first ink amount is less than a threshold value.

19. The print data generating device according to claim 16, wherein the print executing portion is configured to alternately repeat unit printing and unit conveyance,
wherein the print head is configured to print while the conveying mechanism has stopped conveying the printing medium during the unit printing,
wherein the conveying mechanism is configured to convey the printing medium by a unit conveying distance during the unit conveyance, and
wherein the particular distance also is based on the unit conveying distance.

20. The print data generating device according to claim 16, wherein the print executing portion is configured to alternately repeat unit printing and unit conveyance,
wherein the print head is configured to print while the conveying mechanism has stopped conveying the printing medium during the unit printing,
wherein the conveying mechanism is configured to convey the printing medium by a unit conveying distance during the unit conveyance,
wherein each of the plurality of partial image data comprises a plurality of unit image data representing a plurality of unit images to be printed during a plurality of unit printings, and
wherein the image orientation selecting portion is configured to select the one image orientation by using weighting factors assigned to the plurality of unit image data, such that the unit image data corresponding to a unit image to be printed earlier in printing order is assigned a greater weighting factor than a weighting factor of unit image data corresponding to a unit image to be printed later in printing order.

21. The print data generating device according to claim 16, wherein the partial image data used to select the image orientation comprises pixel data in which pixels constituting the partial images are represented by a color level of each of a plurality of colors of ink to be used for printing; and wherein the number of color levels of the pixel data is greater than a number of color levels of dot data representing a dot forming condition per pixel.

22. The print data generating device according to claim 16, wherein the partial image data used to select the image orientation comprises dot data representing a forming condition of dots to be formed by ejecting ink when the partial image is printed.

23. The print data generating device of claim 16, wherein the particular distance is less than the distance between the location of the most-upstream nozzle and the location of the downstream roller for the printer in the conveying direction.

24. A non-transitory, computer-readable storage medium comprising computer-readable instructions for a processor of a print data generating device, the computer-readable instructions instructing the processor to perform the steps of:

selecting one image orientation of an image to be printed from a plurality of image orientations by using a plurality of partial image data; and generating print data for printing the image according to the one selected image orientation, wherein each image orientation of the plurality of image orientations is with respect to a printing-medium conveying direction, wherein each partial image data of the plurality of partial image data corresponds to a respective image orientation of the plurality of image orientations, a respective partial image of a plurality of partial images, and a respective portion of the image to be printed, wherein each partial image of the plurality of partial images is less than an entirety of the image to be printed and is configured to be printed in an area defined by a particular distance determined from a corresponding edge of a printing medium, wherein the particular distance is based on a standard distance between a location of a most-upstream nozzle and a location of a downstream roller for a printer in the printing-medium conveying direction, wherein the particular distance is less than or equal to the standard distance, wherein the particular distance is greater than a distance between the most-upstream nozzle and a most-downstream nozzle for the printer in the printing-medium conveying direction, wherein the image to be printed comprises a first side and a second side, wherein a length of the first side of the image to be printed is less than a length of the second side of the image to be printed, wherein selecting the one image orientation comprises selecting one of a first image orientation, a second image orientation, a third image orientation, and a fourth image orientation from the plurality of image orientations, wherein the first image orientation is an orientation of the image in which the first side of the image is oriented perpendicular to the conveying direction and is to be a side of the image printed first, wherein the second image orientation is an orientation of the image in which the first side of the image is oriented perpendicular to the conveying direction and is a side of the image to be printed last, wherein the third image orientation is an orientation of the image in which the second side of the image is oriented perpendicular to the conveying direction and is a side of the image to be printed first, and wherein the fourth image orientation is an orientation of the image in which the second side of the image is oriented perpendicular to the conveying direction and is the side of the image to be printed last.

* * * * *